United States Patent
Song et al.

(10) Patent No.: US 8,019,023 B2
(45) Date of Patent: Sep. 13, 2011

(54) LOW-COMPLEXITY SCALABLE ARCHITECTURE FOR CONCATENATION-ASSISTED SYMBOL-LEVEL COMBINING

(75) Inventors: Leilei Song, Sunnyvale, CA (US); Jungwon Lee, Cupertino, CA (US); Woong Jun Jang, Stanford, CA (US)

(73) Assignee: Marvell World Trade Ltd., St. Michael (BB)

( * ) Notice: Subject to any disclaimer, the term of this patent is extended or adjusted under 35 U.S.C. 154(b) by 745 days.

(21) Appl. No.: 11/839,004

(22) Filed: Aug. 15, 2007

(65) Prior Publication Data

US 2008/0198941 A1    Aug. 21, 2008

Related U.S. Application Data

(60) Provisional application No. 60/822,827, filed on Aug. 18, 2006.

(51) Int. Cl.
*H04L 27/06* (2006.01)
(52) U.S. Cl. ........................ 375/340
(58) Field of Classification Search ........ 375/259–260, 375/267, 340, 347
See application file for complete search history.

(56) References Cited

U.S. PATENT DOCUMENTS

| | | | |
|---|---|---|---|
| 6,185,258 B1 | 2/2001 | Alamouti et al. | |
| 6,567,388 B1 | 5/2003 | Tomcik et al. | |
| 6,687,492 B1 * | 2/2004 | Sugar et al. | 455/276.1 |
| 6,778,619 B2 * | 8/2004 | Zangi et al. | 375/347 |
| 6,868,520 B1 | 3/2005 | Fauconnier | |
| 6,892,341 B2 | 5/2005 | Golitschek et al. | |
| 6,967,598 B2 | 11/2005 | Mills | |
| 7,031,419 B2 * | 4/2006 | Piirainen | 375/358 |
| 7,194,237 B2 * | 3/2007 | Sugar et al. | 455/39 |
| 7,295,624 B2 | 11/2007 | Onggosanusi et al. | |
| 7,308,047 B2 | 12/2007 | Sadowsky | |
| 7,362,815 B2 * | 4/2008 | Lindskog et al. | 375/264 |
| 7,366,247 B2 | 4/2008 | Kim et al. | |
| 7,382,841 B2 * | 6/2008 | Ohtaki et al. | 375/347 |
| 7,428,269 B2 | 9/2008 | Sampath et al. | |
| 7,489,746 B1 | 2/2009 | Awater et al. | |

(Continued)

FOREIGN PATENT DOCUMENTS

EP    1271835    1/2003

(Continued)

OTHER PUBLICATIONS

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

(Continued)

*Primary Examiner* — Jean B Corrielus

(57) ABSTRACT

Systems and methods are provided for decoding signal vectors in multiple-input multiple-output (MIMO) systems, where a receiver has received one or more signal vectors from the same transmitted vector. The receiver processes these received signal vectors one by one, and uses information from signal vectors that have already been processed to process the next signal vector. To process a current signal vector, the receiver concatenates the current signal vector with a previously processed signal vector. This concatenated signal vector is decoded using, for example, a maximum-likelihood (ML). To decode the concatenated signal vector, the ML decoder can use a concatenated channel matrix that includes a channel response matrix associated with the current signal vector and a processed version of previous channel response matrices.

59 Claims, 30 Drawing Sheets

U.S. PATENT DOCUMENTS

| | | | |
|---|---|---|---|
| 7,502,432 B2* | 3/2009 | Catreux et al. | 375/347 |
| 7,539,274 B2* | 5/2009 | Catreux et al. | 375/347 |
| 7,548,592 B2* | 6/2009 | Wight | 375/299 |
| 7,554,985 B2 | 6/2009 | Ihm et al. | |
| 7,567,583 B2 | 7/2009 | Miyoshi | |
| 7,590,204 B2* | 9/2009 | Monsen | 375/350 |
| 7,593,489 B2* | 9/2009 | Koshy et al. | 375/340 |
| 7,649,953 B2* | 1/2010 | Bauch | 375/267 |
| 7,729,411 B2 | 6/2010 | Wang et al. | |
| 7,742,550 B2* | 6/2010 | Olesen et al. | 375/347 |
| 7,751,506 B2 | 7/2010 | Niu et al. | |
| 7,782,971 B2 | 8/2010 | Burg et al. | |
| 2003/0012318 A1 | 1/2003 | Piirainen | |
| 2004/0049725 A1 | 3/2004 | Golitschek et al. | |
| 2004/0077378 A1 | 4/2004 | Kim et al. | |
| 2004/0181419 A1 | 9/2004 | Davis et al. | |
| 2005/0117520 A1 | 6/2005 | Miyoshi | |
| 2005/0141644 A1 | 6/2005 | Sadowsky | |
| 2006/0039299 A1 | 2/2006 | Ihm et al. | |
| 2006/0107167 A1 | 5/2006 | Jeong et al. | |
| 2006/0165192 A1 | 7/2006 | Ito | |
| 2006/0245476 A1 | 11/2006 | Wang et al. | |
| 2006/0251156 A1* | 11/2006 | Grant et al. | 375/148 |
| 2006/0274836 A1 | 12/2006 | Sampath et al. | |
| 2007/0127603 A1 | 6/2007 | Niu et al. | |
| 2007/0268988 A1 | 11/2007 | Hedayat et al. | |
| 2008/0025427 A1 | 1/2008 | Lee et al. | |
| 2008/0025429 A1 | 1/2008 | Lee et al. | |
| 2008/0025443 A1 | 1/2008 | Lee et al. | |
| 2008/0037670 A1 | 2/2008 | Lee et al. | |
| 2008/0063103 A1 | 3/2008 | Lee et al. | |
| 2008/0144733 A1 | 6/2008 | ElGamal et al. | |
| 2008/0198941 A1 | 8/2008 | Song et al. | |
| 2009/0031183 A1 | 1/2009 | Hoshino et al. | |
| 2009/0063106 A1 | 3/2009 | Burg et al. | |
| 2009/0080579 A1 | 3/2009 | Fujii | |
| 2009/0252236 A1 | 10/2009 | Li et al. | |
| 2009/0307558 A1 | 12/2009 | Lee et al. | |
| 2010/0014601 A1 | 1/2010 | Mo et al. | |

FOREIGN PATENT DOCUMENTS

| | | |
|---|---|---|
| EP | 1501210 | 1/2005 |
| EP | 1608081 B1 | 5/2009 |
| WO | WO 00/52873 | 9/2000 |
| WO | WO 02/067491 | 8/2002 |

OTHER PUBLICATIONS 802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).
Onggosanusi, Eko N. et al. "Hybrid ARQ Transmission and Combining for MIMO systems" *IEEE*, 2003.
Krishnaswamy, Dilip, et al. "Multi-Level Weighted Combining of Retransmitted Vectors in Wireless Communications." *IEEE VTC*. Sep. 2006.
Acolatse, Kodzovi et al. "An Alamouti-based Hybrid-ARQ Scheme for MIMO Systems" 14th IST Mobile and Wireless Communications, Dresden (Jun. 2005).
Acolatse, Kodzovi et al. "Space Time Block Coding HARQ scheme for Highly Frequency Selective Channels" 2007 IEEE International Conference on Communications, pp. 4416-4420 (Jun. 24, 2007).
Alamouti, Siavash M. "A Simple Transmit Diversity Technique for Wireless Communications." IEEE Journal on Select Areas in Communications, vol. 16, No. 8. (Oct. 1998).
Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).
Kim, Woo Tae et al. "Performance of STBC with Turbo Code in HARQ Scheme for Mobile Communication System." Telecommunications, 2003. ICT 2003. 10th International Conference, pp. 85-89 (Feb. 23, 2003).

Koike T. et al. "Hybrid ARQ scheme suitable for coded MIMO transmission" Communications, IEEE International Conference, Paris, France, pp. 2919-2923 (Jun. 20, 2004).
Nagareda R. et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).
Samra H., Zhi Ding "New MIMO ARQ protocols and joint detection via sphere decoding" IEEE Transactions on Signal Processing [online] Feb. 28, 2006, vol. 54, No. 2, pp. 473-482.
Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).
Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).
Tirkkonen, O. et al. "Square-Matrix Embeddable Space-Time Block Codes for Complex Signal Constellations," IEEE Trans. Info. Theory, vol. 48, No. 2, pp. 384-395 (Feb. 2002).
Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).
U.S. Appl. No. 11/724,882, Jungwon Lee et al., filed Mar. 16, 2007.
U.S. Appl. No. 11/782,556, Jungwon Lee et al., filed Jul. 24, 2007.
U.S. Appl. No. 11/781,208, Jungwon Lee et al., filed Jul. 20, 2007.
U.S. Appl. No. 11/781,200, Jungwon Lee et al., filed Jul. 20, 2007.
U.S. Appl. No. 11/834,466, Jungwon Lee et al., filed Aug. 6, 2007.
U.S. Appl. No. 11/833,827, Jungwon Lee et al., filed Aug. 3, 2007.
U.S. Appl. No. 11/834,599, Jungwon Lee, et al., filed Aug. 6, 2007.
Arkhipov, Alexander et al. "OFDMA-CDM performance enhancement H-ARQ and interference cancellation" IEEE Journal on Selected Areas in Communications, vol. 24, pp. 1199-1207 (Jun. 2006).
Cioffi, John et al. "Generalized decision-feedback equalization for packet transmission with ISI and gaussian noise" Communications, computation, control and signal processing: a tribute to Thomas Kailath, pp. 79-127 (1997).
Davis, Linda M. "Scaled and decoupled Cholesky and QR decompositions with application to spherical MIMO detection" IEEE Wireless Communications and Networking, vol. 1, pp. 326-331 (2003).
Dekorsy, Armin "A cutoff rate based cross-layer metric for MIMO-HARQ transmission" IEEE 16th International Symposium on Personal, Indoor and Mobile Radio Communications, vol. 4, pp. 2166-2170 (2005).
Gharavi-Alkhansari, Mohammad et al. "Constellation Space Invariance of Space-Time Block Codes with Application to Optimal Antenna Subset Selection" 4th IEEE Workshop on Signal Processing Advances in Wireless Communications, pp. 269-273 (2003).
Ginis, George et al. "On the relation between V-BLAST and the GDFE" IEEE Communications Letters, vol. 5, pp. 364-366 (2001).
Hassibi, Babak "An efficient square-root algorithm for BLAST" IEEE International Conference on Acoustics, Speech, and Signal Processing, vol. 2, pp. 737-740 (2000).
Liu, Peng et al. "A new efficient MIMO detection algorithm based on Cholesky decomposition," The 6th International Conference on Advanced Communication Technology, vol. 1, pp. 264-268 (2004).
Nakajima, Akinori et al. "Throughput of turbo coded hybrid ARQ using single-carrier MIMO multiplexing" IEEE 61st Vehicular Technology Conference, vol. 1, pp. 610-614 (2005).
Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).
Oh, Mi-Kyung et al. "Efficient hybrid ARQ with space-time coding and low-complexity decoding" IEEE Conference on Acoustics, Speechc, and Signal Processing, vol. 4, pp. 589-592 (2004).
Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Theofilakos, Panagiotis et al. "Frobenius Norm Based Receive Antenna Subarray Formation for MIMO Systems" First European Conference on Antennas and Propagation, pp. 1-5 (2006).

Wolniansky, P.W. et al. "V-BLAST: an architecture for realizing very high data rates over the rich-scattering wireless channel" URSI International Symposium on Signals, Systems, and Electronics, pp. 295-300 (1998).

Wübben, Dirk et al. "MMSE extension of V-BLAST based on sorted QR decomposition" IEEE 58th Vehicular Technology Conference, vol. 1, pp. 508-512 (2003).

Non-Final Office Action in relation to U.S. Appl. No. 11/724,882 dated Dec. 9, 2009.

Non-Final Office Action in relation to U.S. Appl. No. 11/834,466 dated Sep. 14, 2010.

Non-Final Office Action in relation to U.S. Appl. No. 11/834,599, dated Sep. 23, 2010.

Jang et al. "An Efficient Symbol-Level Combining Scheme For MIMO Systems With Hybrid ARQ", IEEE Transactions on Wireless Communications, vol. 8, pp. 2443-2451, May 26, 2009.

Non-Final Office Action dated Jul. 26, 2010, relating to, U.S. Appl. No. 11/782,556.

Response to Non-Final Office Action dated Oct. 26, 2010, relating to, U.S. Appl. No. 11/782,556.

Final office Action dated Jan. 25, 2011, relating to, U.S. Appl. No. 11/782,556.

Response to Final Office Action (RCE) dated Apr. 25, 2011, relating to, U.S. Appl. No. 11/782,556.

Non Final Office Action dated Apr. 20, 2010, relating to, U.S. Appl. No. 11/781,208.

Response to Non Final Office Action dated Jul. 13, 2010, relating to, U.S. Appl. No. 11/781,208.

Final Office Action dated Aug. 2, 2010, relating to, U.S. Appl. No. 11/781,208.

Response to Final Office Action dated Sep. 29, 2010, relating to, U.S. Appl. No. 11/781,208.

Advisory Action dated Oct. 12, 2010, relating to, U.S. Appl. No. 11/781,208.

Response to Advisory Action dated Nov. 2, 2010, relating to, U.S. Appl. No. 11/781,208.

Notice of Allowance dated Feb. 16, 2011, relating to, U.S. Appl. No. 11/781,208.

Non-Final Office Action dated Aug. 31, 2010, relating to, U.S. Appl. No. 11/833,827.

Response to Non-Final Office Action dated Nov. 20, 2010, relating to, U.S. Appl. No. 11/833,827.

Final Office Action dated Feb. 18, 2011, relating to, U.S. Appl. No. 11/833,827.

Response to Final Office Action dated Apr. 15, 2011, relating to, U.S. Appl. No. 11/833,827.

Advisory Action dated Apr. 26, 2011, relating to, U.S. Appl. No. 11/833,827.

Non-Final Office Action dated Jun. 18, 2010, relating to, U.S. Appl. No. 11/854,219.

Response to Non-Final Office Action dated Sep. 20, 2010, relating to, U.S. Appl. No. 11/854,219.

Ex-Parte Quayle Action dated Nov. 9, 2010, relating to, U.S. Appl. No. 11/854,219.

Response to Ex-Parte Quayle Action dated Jan. 14, 2011, relating to, U.S. Appl. No. 11/854,219.

Notice of Allowance dated May 3, 2011, relating to, U.S. Appl. No. 11/854,219.

Non-Final Office Action dated Feb. 2, 2010, relating to, U.S. Appl. No. 12/059,945.

Response to Non-Final Office Action dated Apr. 30, 2010, relating to, U.S. Appl. No. 12/059,945.

Final Office Action dated Jul. 21, 2010, relating to, U.S. Appl. No. 12/059,945.

Response Final Office Action (RCE) dated Oct. 21, 2010, relating to, U.S. Appl. No. 12/059,945.

Non-Final Office Action dated Feb. 3, 2011, relating to, U.S. Appl. No. 12/059,945.

Response to Non-Final Office Action dated May 3, 2011, relating to, U.S. Appl. No. 12/059,945.

Non-Final Office Action dated Apr. 29, 2010, relating to, U.S. Appl. No. 11/781,200.

Response to Non-Final Office Action dated Jul. 13, 2010, relating to, U.S. Appl. No. 11/781,200.

Final Office Action dated Aug. 20, 2010, relating to, U.S. Appl. No. 11/781,200.

Response to Final Office Action dated Oct. 20, 2010, relating to, U.S. Appl. No. 11/781,200.

Advisory Action dated Oct. 25, 2010, relating to, U.S. Appl. No. 11/781,200.

Response to Advisory Action dated Nov. 22, 2010, relating to, U.S. Appl. No. 11/781,200.

Notice of Allowance dated Dec. 9 2010, relating to, U.S. Appl. No. 11/781,200.

Supplemental Notice of Allowance dated Mar. 4, 2011, relating to, U.S. Appl. No. 11/781,200.

Non-Final Office Action dated Aug. 31, 2010, relating to, U.S. Appl. No. 11/833,827.

Response Non-Final Office Action dated Nov. 20, 2010, relating to, U.S. Appl. No. 11/833,827.

Final Office Action dated Feb. 18, 2011, relating to, U.S. Appl. No. 11/833,827.

Response to Final Office Action dated Apr. 15, 2011, relating to, U.S. Appl. No. 11/833,827.

Advisory Action dated Apr. 26, 2011, relating to, U.S. Appl. No. 11/833,827.

Response to Non-Final Office Action dated Dec. 13, 2010, relating to, U.S. Appl. No. 11/834,466.

Non-Final Office Action dated Mar. 4, 2011, relating to, U.S. Appl. No. 11/834,466.

Response to Final Office Action dated May 4, 2011, relating to, U.S. Appl. No. 11/834,466.

Non-Final Office Action dated Nov. 24, 2010, relating to, U.S. Appl. No. 11/724,882.

Response to Non-Final Office Action dated Feb. 22, 2011, relating to, U.S. Appl. No. 11/724,882.

Notice of Allowance dated Aug. 24, 2010, relating to, U.S. Appl. No. 11/724,882.

Supplemental Notice of Allowance dated Apr. 15, 2011, relating to, U.S. Appl. No. 11/724,882.

Response to Non-Final Office Action dated Dec. 15, 2010, relating to, U.S. Appl. No. 11/834,599.

Final Office Action dated Mar. 3, 2011, relating to, U.S. Appl. No. 11/834,599.

Response to Final Office Action dated May 3, 2011, relating to, U.S. Appl. No. 11/834,599.

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

* cited by examiner $$\begin{bmatrix} y_1 \\ \vdots \\ y_{N_r} \end{bmatrix}_i = \begin{bmatrix} h_{11} & \cdots & h_{1N_t} \\ \vdots & \ddots & \vdots \\ h_{N_r 1} & \cdots & h_{N_r N_t} \end{bmatrix}_i \begin{bmatrix} x_1 \\ \vdots \\ x_{N_t} \end{bmatrix} + \begin{bmatrix} n_1 \\ \vdots \\ n_{N_r} \end{bmatrix}_i$$

$$\mathbf{y}_i = H_i \mathbf{x} + \mathbf{n}_i$$

FIG. 5

$$\mathbf{y} = \begin{bmatrix} y_1 & \cdots & y_{N_r} \end{bmatrix}_1 \cdots \mathbf{y}_N \quad = \quad \begin{bmatrix} h_{11} & \cdots & h_{1N_t} \\ \vdots & \ddots & \vdots \\ h_{N_r 1} & \cdots & h_{N_r N_t} \end{bmatrix}_1 \cdots H_N \quad \times \quad \mathbf{x} \quad + \quad \begin{bmatrix} n_1 & \cdots & n_{N_r} \end{bmatrix}_1 \cdots \mathbf{n}_N$$

$(NN_r \times 1)$     $(NN_r \times N_t)$     $(N_t \times 1)$     $(NN_r \times 1)$

FIG. 12

$$\begin{bmatrix} \phi_1 \circlearrowright a_{11} & a_{12} \\ \phi_2 \circlearrowright a_{21} & a_{22} \end{bmatrix} \overset{A}{}$$

$$\Downarrow$$

$$\begin{bmatrix} a'_{11} \searrow_{\theta_1} h_{12} \\ a'_{21} \nearrow h_{22} \end{bmatrix} \text{—1802}$$

$$\Downarrow$$

$$\begin{bmatrix} r_{11} & r_{12} \\ 0 & \circlearrowright h'_{22} \\ & \phi_3 \end{bmatrix} \text{—1804}$$

$$\Downarrow$$

$$\begin{bmatrix} r_{11} & r_{12} \\ 0 & r_{22} \end{bmatrix} \overset{R}{}$$

FIG. 18

LOW-COMPLEXITY SCALABLE ARCHITECTURE FOR CONCATENATION-ASSISTED SYMBOL-LEVEL COMBINING

CROSS-REFERENCE TO RELATED APPLICATIONS

This application claims the benefit under 35 U.S.C. §119(e) of U.S. Provisional Application No. 60/822,827, filed Aug. 18, 2006, which is incorporated herein by reference in its entirety.

BACKGROUND OF THE INVENTION

This invention relates to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors.

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, it would be desirable to provide a system or method for effectively utilizing information from an arbitrary number of transmitted packets that does not drastically increase the complexity of the system.

SUMMARY OF THE INVENTION

Accordingly, systems and methods for reliable transmission in multiple-input multiple-output systems are disclosed, where a receiver obtains multiple signal vectors from the same transmit signal vector and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

In one embodiment of the present invention, when the receiver has $N \geq 1$ received vectors from the same transmit signal, the receiver concatenates the received signal vectors into one $NN_r$-dimensional vector. The receiver may decode the combined vector directly using a decoder, such as a maximum-likelihood (ML) decoder.

In some embodiments of the invention, the N channel response matrices, also referred to as channel matrices, which define how each of the channels alter the transmitted signal in a noiseless scenario, are also concatenated into a single $NN_r \times N_t$ matrix. The concatenated channel matrix may be used by a decoder (e.g., an ML decoder) to decode a combined received signal vector. In some embodiments, a preprocessor processes the concatenated channel response matrix, also called the concatenated channel matrix. Then, rather than directly decoding the concatenated $NN_r$-dimensional received vector, the concatenated received vector is processed or equalized according to information obtained from preprocessing the concatenated channel matrix. The result of the equalization operation is a processed signal vector that may be decoded using the same decoder no matter how large or small N is. Thus, the complexity of the receiver may be drastically reduced.

A preprocessor may preprocess a concatenated channel matrix by decomposing the concatenated channel matrix into an upper triangular matrix, R, and an orthogonal matrix Q. This preprocessing technique is referred to as QR decomposition. A combined received signal vector may then be processed/equalized or decoded according to Q or R, rather than the original concatenated channel response matrix, H. Because R has fewer non-zero components than H, decoding a combined signal vector using R may use considerably fewer computations than decoding based on H. The preprocessor may decompose a concatenated channel response matrix using any suitable technique, such as performing a series of Given's rotations.

Like the decoder, the remaining components in a receiver (e.g., a channel preprocessor) can be made to perform the same operations regardless of the number of received signal vectors. Instead of concatenating all N channel matrices and received signal vectors, where N>1, the receiver may operate on the received signal vectors one at a time. A current combined signal vector may include a previously processed combined signal vector along with the signal vector currently being operated on. A concatenated channel matrix may also include previously preprocessed channel information, such as an $N_t \times N_t$ R matrix from a previous QR decomposition, along with a channel matrix associated with the signal vector currently being operated on. Thus, in some embodiments, rather than creating and processing an $NN_r$-dimensional combined signal vector and an $NN_r \times N_t$ concatenated channel matrix, the receiver may create and process a $(N_t+N_r)$-dimensional combined signal vector and a $(N_t+N_r) \times N_t$ concatenated channel matrix. Because the dimensions of the combined signal vector and concatenated channel matrix no longer depend on N, the complexity, number of computations, and storage requirement of the concatenation and processing steps do not depend on the number of received signal vectors. This may be very beneficial for protocols such as HARQ, where N may vary and can potentially be large. Furthermore, there is no degradation in decoding performance from using these embodiments, because the $(N_t+N_r)$-dimensional combined signal vector and the $(N_t+N_r) \times N_t$ concatenated channel matrix may include information from all signal vectors operated on up to that point.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

FIG. 12 is a vector model of the concatenated system of FIG. 10;

FIG. 18 illustrates a QR decomposition of a 2×2 matrix using Given's rotations;

DETAILED DESCRIPTION

The disclosed invention provides a technique in a multiple-input multiple-output data transmission or storage system to decode a signal vector at a receiver, where the receiver may receive multiple signal vectors from the same transmitted signal vector.

Figure 1:
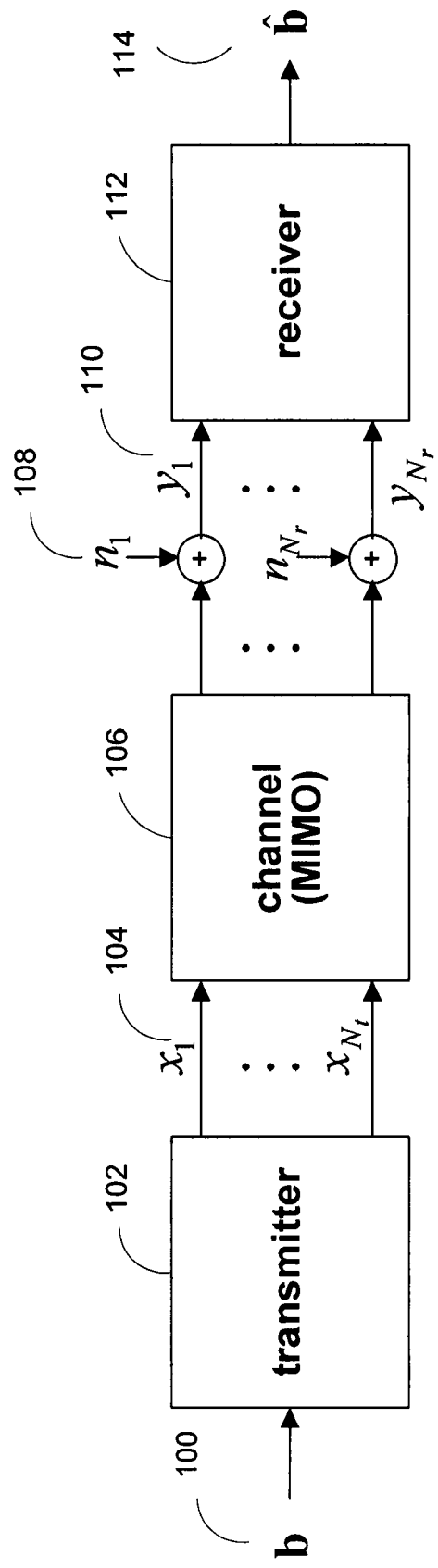
FIG. 1 is a high level block diagram of a multiple-input multiple-output data transmission or storage system in accordance with one embodiment of the invention.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
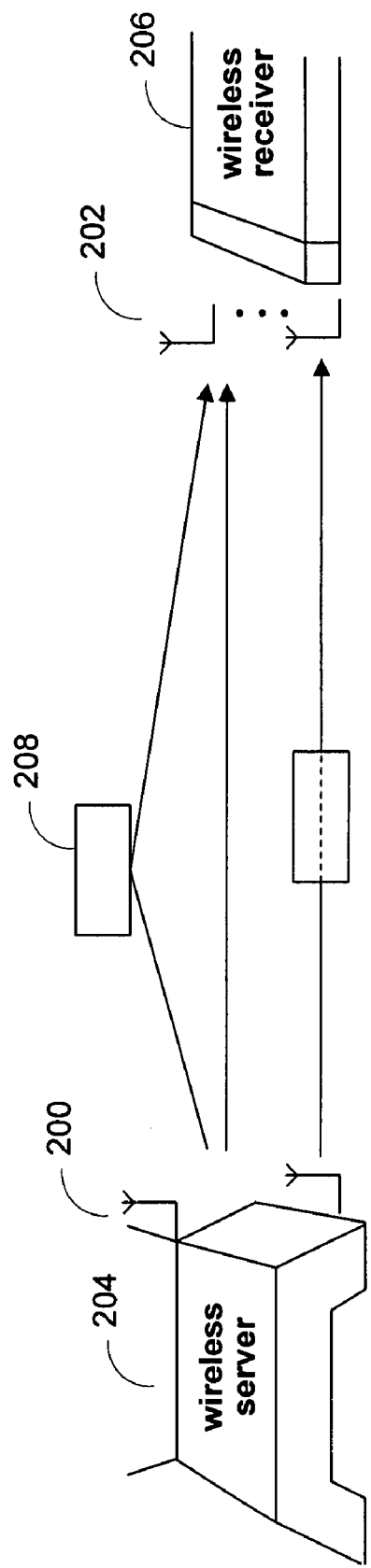
FIG. 2 is a wireless transmission system in accordance with one embodiment of the system in FIG. 1.

In one embodiment, FIG. 1 represents a wireless communication system, pictured in FIG. 2. In this preferred embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
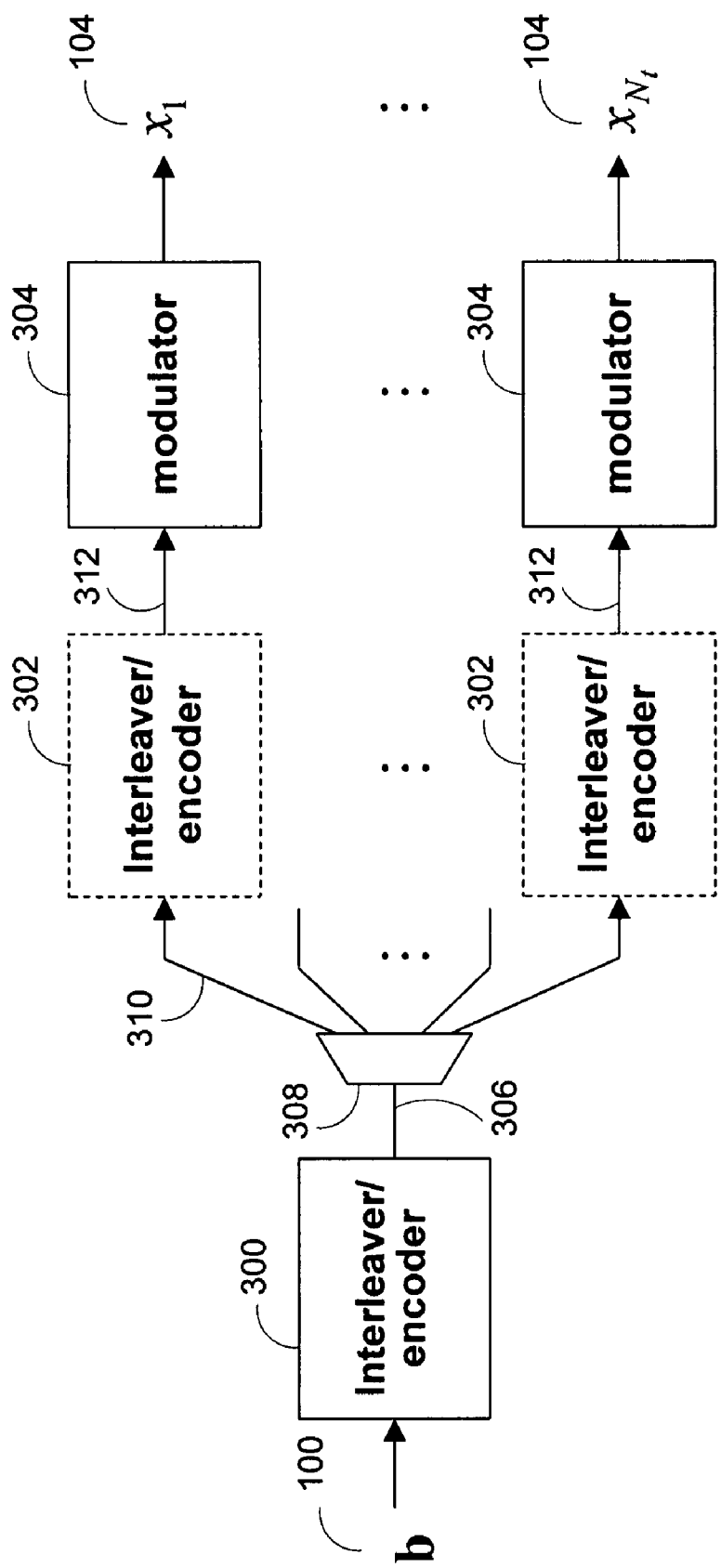
FIG. 3 is a block diagram of a transmitter in accordance with one embodiment of the invention.

One embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300, which may interleave and/or encode bit sequence 100. If interleaver/encoder 300 performs encoding, the encoding may be based on any suitable error control code (e.g., convolutional, block, error-detecting, error correcting, etc.). If interleaving is performed, each bit in bit sequence 100 may be assumed to be independent of all other bits in bit sequence 100. Bit sequence 306 at the output of interleaver 300 can be demultiplexed by demultiplexer 308 across $N_t$ paths. Each demultiplexed output 310 may or may not go through another interleaver and/or encoding block 302, yielding bit sequences 312. Finally, bit sequences 312 are modulated with modulators 304, and are transmitted as signals $x_1, \ldots, x_{Nt}$, or x in vector form.

Figure 4A:
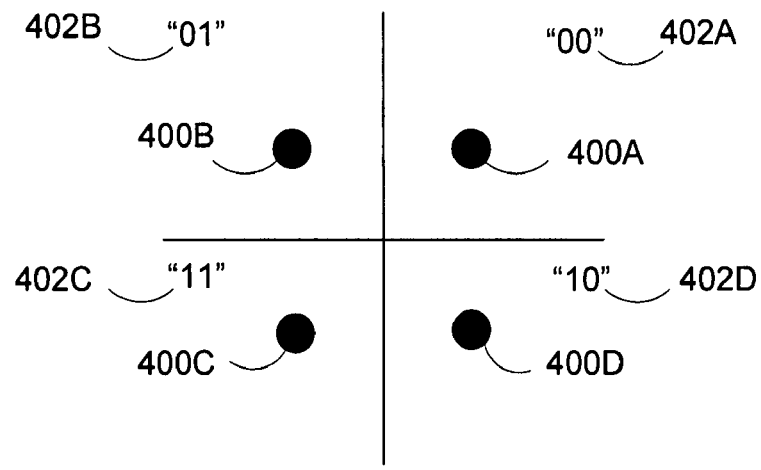
FIG. 4A is a signal constellation set for quadrature amplitude modulation with four signal points.

Modulators 304 group the incoming bits into symbols, which are mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10.". However, any other one-to-one mapping from symbol to signal point is valid.

Figure 4B:
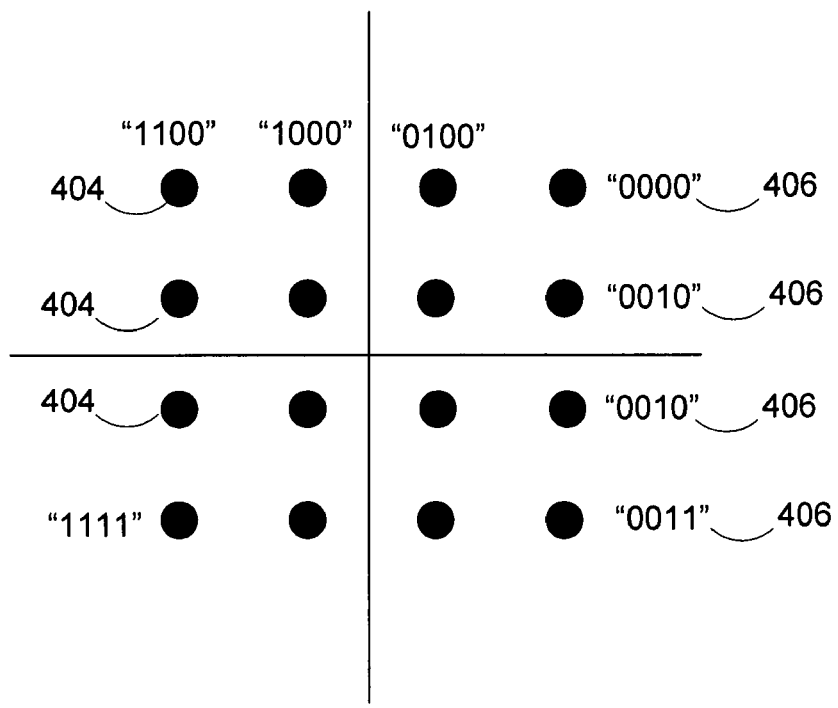
FIG. 4B is a signal constellation set for quadrature amplitude modulation with 16 signal points.

Similarly, FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting $mN_t$ bits concurrently.

In accordance with one embodiment of the present invention, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may need a buffer to store x, or equivalently bit stream 100, in the event that a retransmission is requested.

Even though x is transmitted, receiver 112 in FIG. 1 actually receives $y_i$, where $$y_i = H_i x + n_i \quad 1 \leq i \leq N \tag{1}$$

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. Thus, for simplicity, a MIMO system with $N_t$ input and $N_r$ output will be referred to as a $N_r \times N_t$ MIMO system. $n_i$ is an $N_r \times 1$ vector of additive noise. Note that the characteristics of channel 106, reflected in matrix 500, and noise sources 108, and therefore received signal 110, may be different for each instance i. Differences arise because each transmission of x occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n_i$ does not affect the noise for any other component in $n_i$, and the noise at any time instant does not affect the noise at another time instant. Also, all of the noise sources have the same probabilistic characteristics. Furthermore, each component of $n_i$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $Pr\{y|x,H\}$, is given by $$Pr\{y \mid x, H\} = \frac{1}{(\pi N_0)^N} \exp\left\{-\frac{\|y - Hx\|^2}{N_0}\right\} \tag{2}$$

Equation (2) will be used with reference to maximum-likelihood decoding discussed in greater detail below in connection with FIG. 10.

Receiver 112 of FIG. 1 may use one or more of the N received copies of x to determine the information that was transmitted. Receiver 112 may combine multiple received vectors into a single vector for decoding, thereby utilizing more than one, and possibly all, of the transmitted signal vectors. The combining scheme disclosed in the present invention will be discussed in greater detail below in connection with FIGS. 7-15 and FIGS. 20-21. It should be understood that the receiver in the present invention may utilize all received signal vectors. Alternatively, information about a subset of the received signal vectors and channel matrices may be used. For example, a received signal vector and its corresponding channel matrix may be discarded if the magnitude of a component in the received signal vector is below a certain threshold. Thus, the variable N should refer to the number of received signal vectors used by the receiver, which is not necessarily the same as the number of total signal vectors received.

Figure 6A:
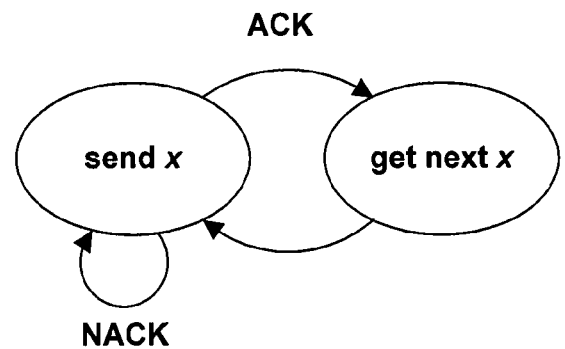
FIG. 6A is a flow diagram of a stop-and-wait HARQ transmitter.
Figure 6B:
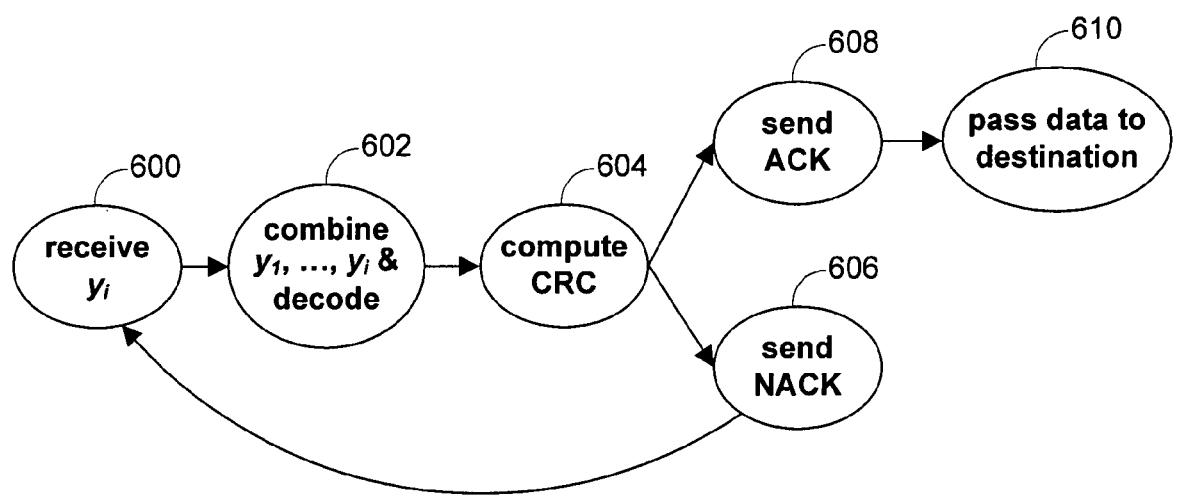
FIG. 6B is a flow diagram of a HARQ receiver.

In one embodiment of the invention, receiver 112 of FIG. 1 receives multiple instances of a common transmit vector using a retransmission protocol. For example, the transmitter and receiver may use a HARQ type-I protocol. The flow chart of the steps taken by transmitter 102 and receiver 112 are shown in FIG. 6A and FIG. 6B, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one aspect of the invention. At some time, receiver 112 receives $y_i$ at step 600, corresponding to the ith transmission of x. At step 602, receiver 112 combines all received vectors corresponding to transmitted signal vector x, that is $y_1, \ldots, y_i$, into a single vector, $\tilde{y}$, and decodes the combined vector. In FIG. 6B, decoding refers to determining the CRC-protected message based on the combined signal vector. Other possible decoding outputs will be discussed in greater detail below in connection with FIG. 7. Errors in the data may be corrected by combining the received signal vectors such that the combined signal vector, $\tilde{y}$, is correctable by decoding. Following decoding, error detection is performed at step 604, which in this case involves checking the CRC of the decoded vector. If errors are detected, the receiver sends a negative acknowledgement (NACK) message to the transmitter at step 606. Upon receipt of the NACK, the transmitter sends the same transmitted signal vector, which is received at step 600 as $y_{i+1}$. $y_{i+1}$ is different from $y_i$ even though the same transmit signal vector x is used at the transmitter, because $y_{i+1}$ is transmitted at a later time than $y_i$ and is affected by different noise and channel characteristics. The i+1 vectors are combined and decoded, as described previously. This procedure occurs N times, until by combining and decoding N received vectors, no CRC error is detected. At this point, the receiver sends an acknowledgment (ACK) message at step 608 back to the transmitter to inform the transmitter that the vector has been successfully received. Also, since there are no errors in the data, the receiver passes the data to the destination at step 610.

In a second embodiment of the invention, the transmitter sends a signal vector, x, a fixed number of times, irrespective of the presence of errors. For example, the receiver may obtain N transmissions of x from repetition coding. N copies of x are transmitted simultaneously, or within some interval of time. The receiver combines $y_1, \ldots, y_N$, and decodes the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that, again referring to the HARQ flow diagram of FIG. 6B, multiple vectors are received at 600 before combining and decoding at 602. The invention, however, is not limited to the two protocols and their combination mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Figure 7:
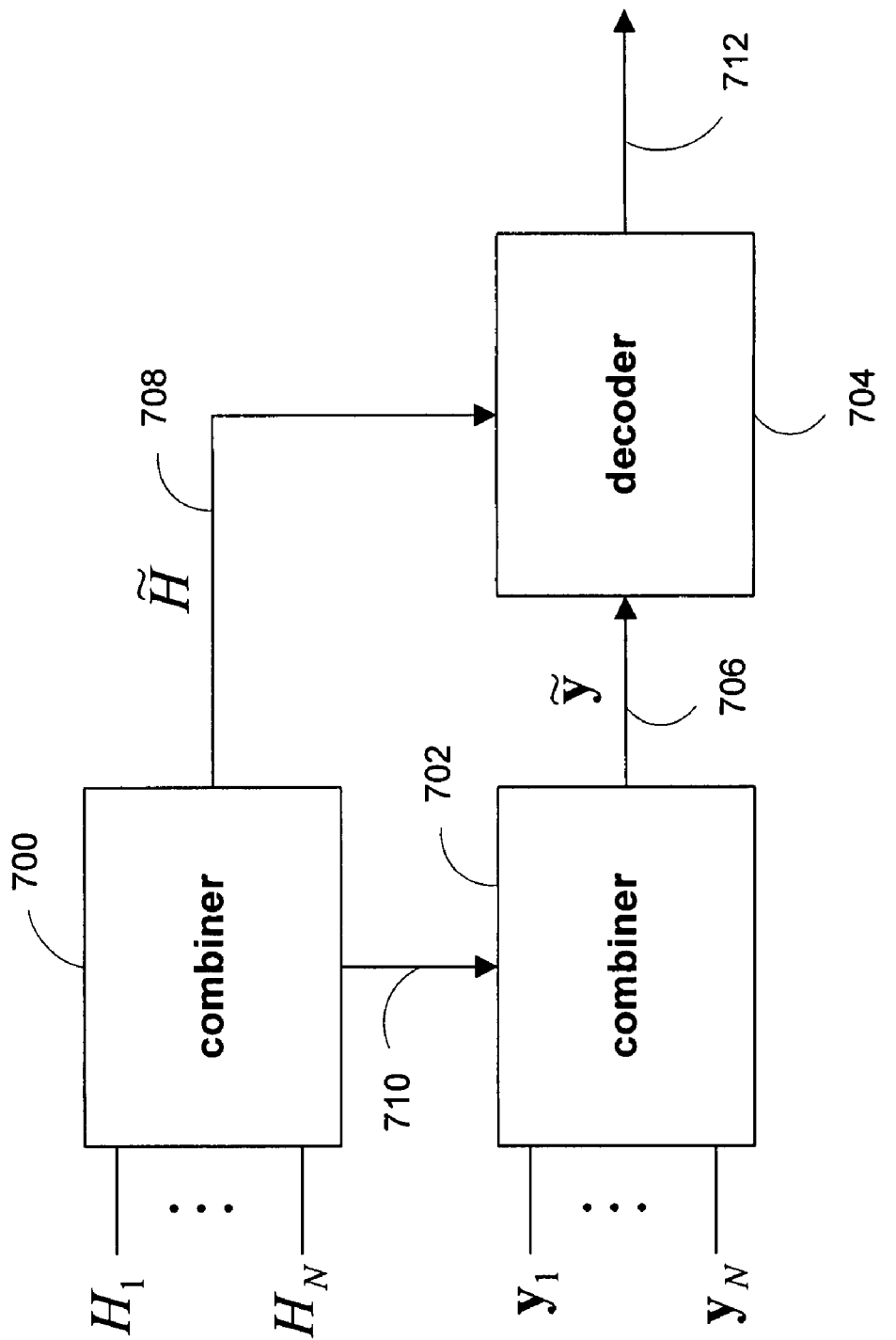
FIG. 7 is a high level block diagram of a receiver in accordance with the invention.

FIG. 7 is a block diagram of receiver 112 in accordance with one embodiment of the present invention. Furthermore, it illustrates one way to implement combining and decoding at step 602 in the HARQ flow diagram of FIG. 6B. Combiner 702, which may or may not use channel information 710 provided from channel combiner 700, combines the received signal vectors. This technique is called symbol-level combining, because the combiner operates on the signals of the signal vector, which represents a symbol of information at any given time. Combined received vector 706 is decoded using decoder 704. Decoder 704 may use channel information 708 provided by combiner 700 to operate on combined received vector 706. A decoder refers to a component that uses a signal to make a decision as to the data that was transmitted. Accordingly, decoder 704 may return an estimate of the transmit signal vector, x, or of the transmit bit sequence, b, at decoder output 712. It may return soft information or hard information. If decoder 704 returns hard information, it may have been the result of hard-decoding or soft-decoding. For a coded system, decoder 704 may return coded information or decoded information.

Figure 8:
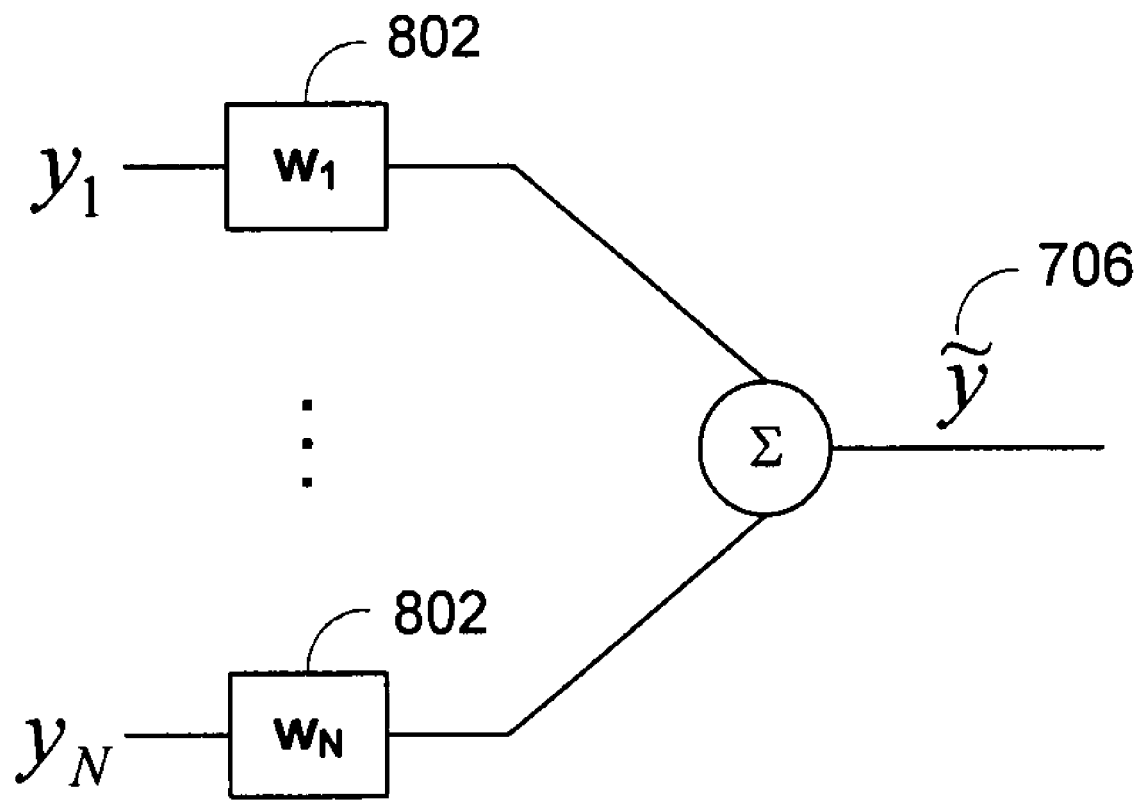
FIG. 8 is one embodiment of the combiner in FIG. 7 for a single input, single output (SISO) system.

For single input, single output (SISO) systems, where $N_t=N_r=1$, one way to implement the combiner of FIG. 7 is shown in FIG. 8. The received symbols, $y_1, \ldots, y_N$, are combined by taking a weighted sum of the symbols. Weights 802 for the received symbols are conventionally chosen to maximize the signal-to-noise ratio (SNR), a technique called maximal ratio combining (MRC). MRC with ML decoding is a preferred method for decoding multiple received signals in the presence of AWGN. Either hard-decoding or soft-decoding may be performed, depending on the situation (e.g. uncoded system, coded system, etc.).

Figure 9:
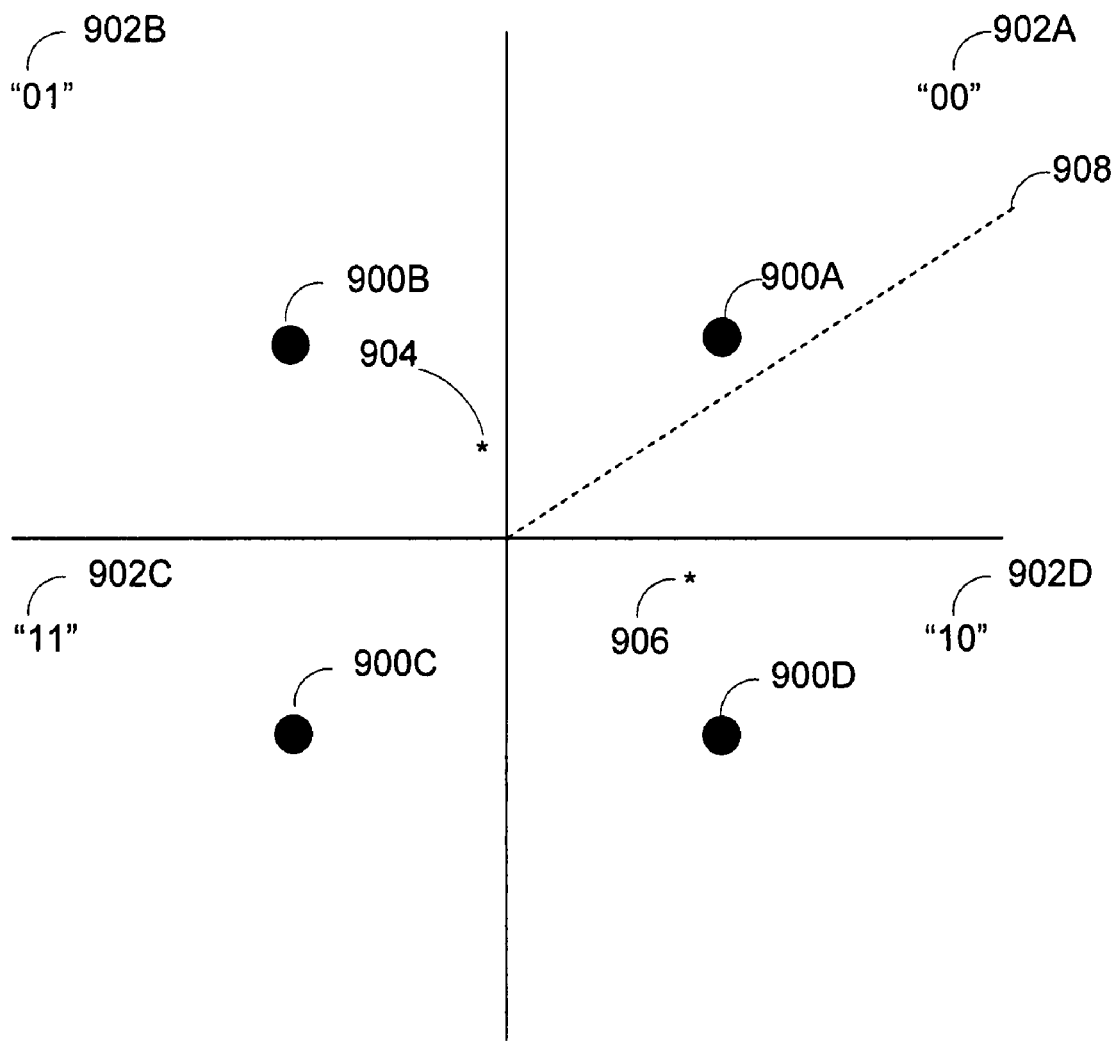
FIG. 9 is a diagram illustrating an example of symbol-level combining using weighted addition.

FIG. 9 shows an example of MRC, or any other weighted addition combining, for a SISO system. The signal constellation set is 4-QAM, which was previously described in connection with FIG. 4A. Signal points 900A-900D represent the magnitude and phase of the transmitted symbol. For illustration purposes, assume that the transmitter is sending the symbol, "00" (900A) to the receiver using a HARQ type-I protocol. Assume, for the purpose of illustration, that the channel does not attenuate, amplify, or alter the signal in any way. Therefore, ideally, the magnitude and phase of a received signal is the same as the transmitted signal. If, due to additive noise, a signal corresponding to signal point 904 is actually received, it will be incorrectly decoded as "01," because it is closer to signal point 900B than 900A. Note that an ML decoder will make this decision if the noise is AWGN. The error-detecting code may then detect the presence of the bit error, resulting in a request for a retransmission. On the second transmission, a signal corresponding to signal point 906 is received. If signal point 906 is decoded on its own, it will be incorrectly decoded as "10." However, by weighted addition, the resulting combined symbol falls approximately on dotted line 908. The combined symbol is now closest to signal point 900A and will be decoded correctly as "00." The above example shows how error correction can be performed by combining vectors that, decoded individually, have errors. Thus, using a symbol-level combining scheme may also result in fewer retransmissions in a HARQ type-I protocol.

Note that HARQ type-II and HARQ type-III are not applicable to symbol-level combining, as described above. The symbols being transmitted are not always the same in successive transmissions, because HARQ type-II and HARQ type-III utilize incremental redundancy and therefore change the bit stream being transmitted.

The extension from SISO to general MIMO systems for decoding multiple received vectors for the same transmit vector is not straightforward. Thus, the present invention discloses a different form of symbol-level combining, called Concatenation-Assisted Symbol-Level (CASL) combining, that is extendable to MIMO systems.

Figure 10:
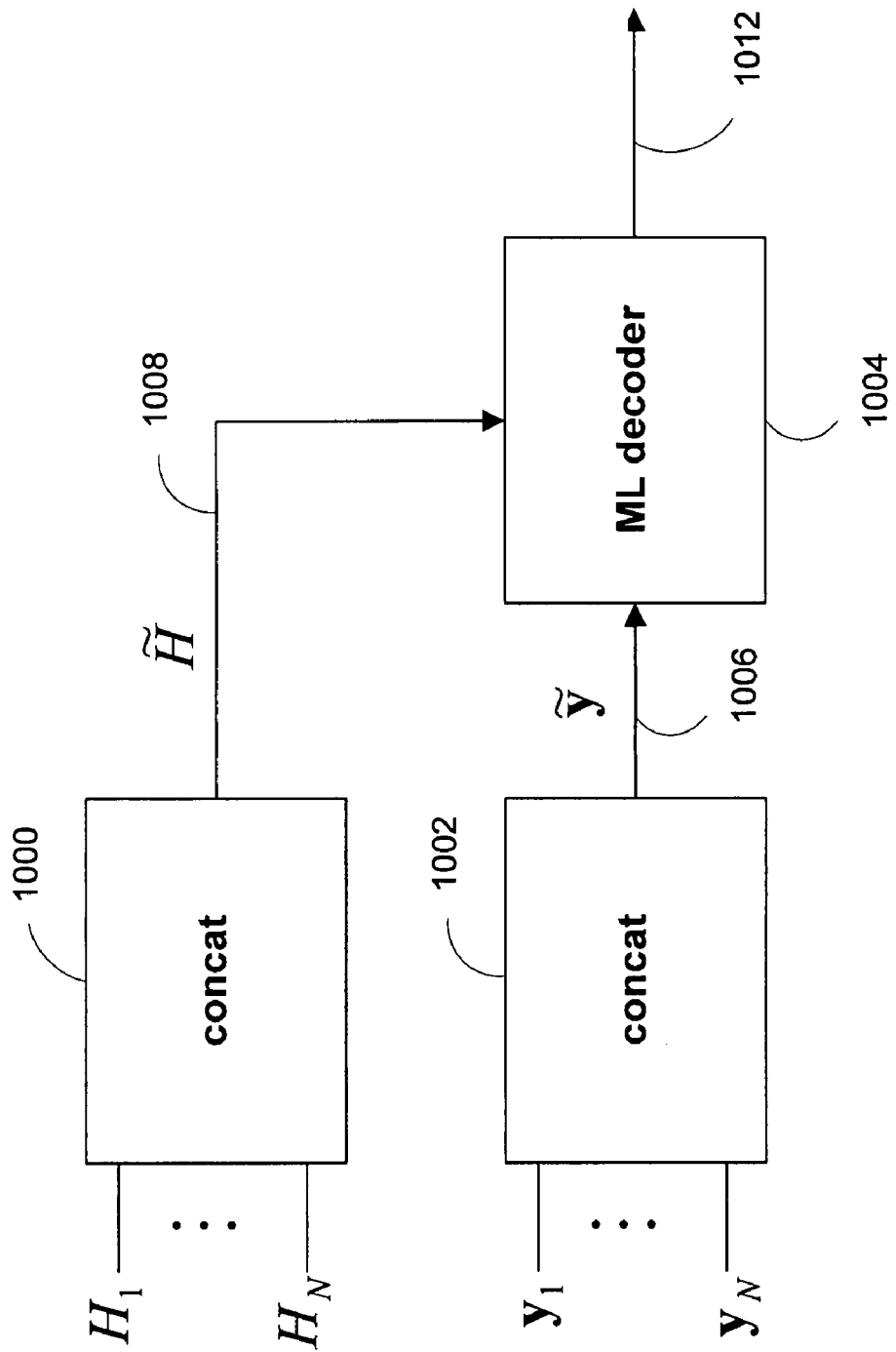
FIG. 10 is one embodiment of FIG. 7 for a multiple-input multiple-output system using concatenation-assisted symbol-level combining and maximum-likelihood decoding.

FIG. 10 shows a simplified diagram of a CASL Combining receiver using maximum-likelihood decoding in accordance with one embodiment of the invention. Combiner 1002 concatenates each of the received vectors into $NN_r$-dimensional vector 1006, $\tilde{y}$. Combined vector 1006 is then decoded using ML decoder 1004, which may decode $\tilde{y}$ using channel information 1008 from combiner 1000. Based on the received vector, an ML decoder for a MIMO system, such as decoder 1004, can pick a valid transmit vector that has the highest probability of being sent. Mathematically, this corresponds to choosing the transmit vector that maximizes equation (2) for a received signal vector, $\tilde{y}$, and an effective channel matrix, $\tilde{H}$, corresponding to $\tilde{y}$. Equivalently, for an AWGN channel, an ML decoder picks the values of a valid transmit signal vector $\hat{x}$ that minimizes the magnitude of the noise. Thus, the metric implemented by decoder 1004 is $\|\tilde{y}-\tilde{H}\hat{x}\|^2$. For a coded system, an ML decoder may also decode the received vector by choosing the most likely codeword that was sent, and obtaining the corresponding message.

Figure 11A:
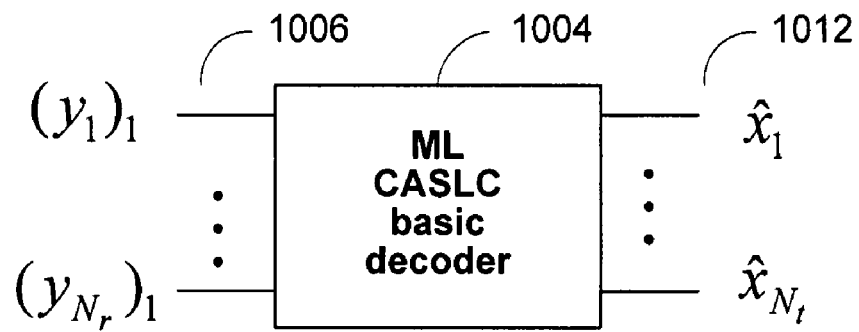
FIG. 11A is diagram illustrating the input/output relationship for the maximum-likelihood decoder of FIG. 10 when one signal vector is received.

When the system of FIG. 10 has received only one instance of x, where $$y_1 = H_1 x + n_1, \quad (3)$$

the concatenation steps performed by combiners 1002 and 1000 are simple. That is, vector 1006 is simply $y_1$, and vector 1008 is simply $H_1$. ML decoder 1004 may estimate the $N_t \times 1$ common transmitted signal vector 104 from the $N_r \times 1$ signal vector 1006. For clarity, the input/output relationship of decoder 1004 when only one signal vector has been received is shown in FIG. 11A.

When the system of FIG. 10 has received N signal vectors ($N \geq 2$), the channel matrices and received signal vectors are concatenated by combiners 1000 and 1002, yielding combined signal vector 1006 and combined channel matrix 1008, respectively. For system modeling purposes, the noise vectors are also concatenated. Thus, the combined vectors are $$\tilde{y} = [y_1^T y_2^T \ldots y_N^T]^T \quad (4)$$

$$\tilde{n} = [n_1^T n_2^T \ldots n_N^T]^T \quad (5)$$

$$\tilde{H} = [H_1^T H_2^T \ldots H_N^T]^T, \quad (6)$$

$\tilde{y}$ and $\tilde{n}$ are the $NN_r \times 1$ concatenated received signal vector and concatenated noise vector, respectively, and $\tilde{H}$ is the $NN_r \times N_t$ concatenated channel matrix. After concatenation, the new channel model for the system is shown in equation (8). For clarity, FIG. 12 shows each component of the vectors and matrix in equation (8). Note that equations (7) and (8) are equivalent, since there is no loss of information in concatenation. Therefore, if an optimal decoder is used, the system has optimal performance.

$$y_i = H_i x + n_i, \quad i = 1, \ldots, N. \quad (7)$$

$$\tilde{y} = \tilde{H} x + \tilde{n}. \quad (8)$$

Following concatenation, decoder 1004 estimates the transmitted signal from $NN_r \times 1$ signal vector 1006, $\tilde{y}$, using the ML metric, $\|\tilde{y}-\tilde{H}x\|^2$, as previously defined. For clarity, the input/output relationship of a decoder with N received vectors is shown in FIG. 11B.

Figure 11B:
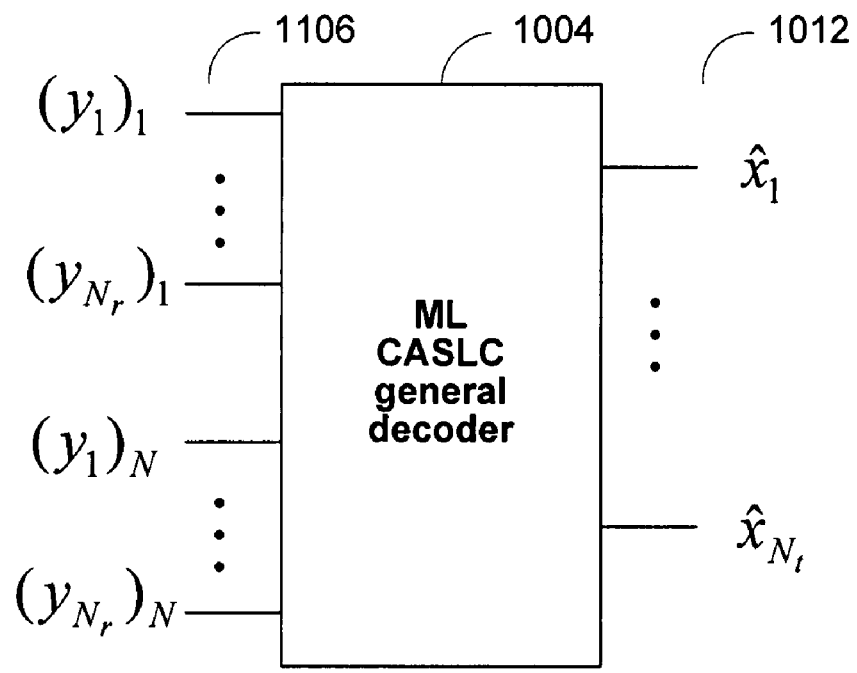
FIG. 11B is a diagram illustrating the input/output relationship for the maximum-likelihood decoder of FIG. 10 when N signal vectors are received.

FIG. 11B shows that the number of inputs into decoder 1004 varies with the number of received vectors. Therefore, to implement the block diagram of FIG. 10, decoder 1004 may need to include separate decoders for each possible N. However, using a separate decoder for each N would drastically increase both the amount and complexity of the hardware. In addition, since it would be impractical and impossible to implement a different decoder for all $N \geq 1$, the decoding flexibility of the receiver would be limited.

Figure 13:
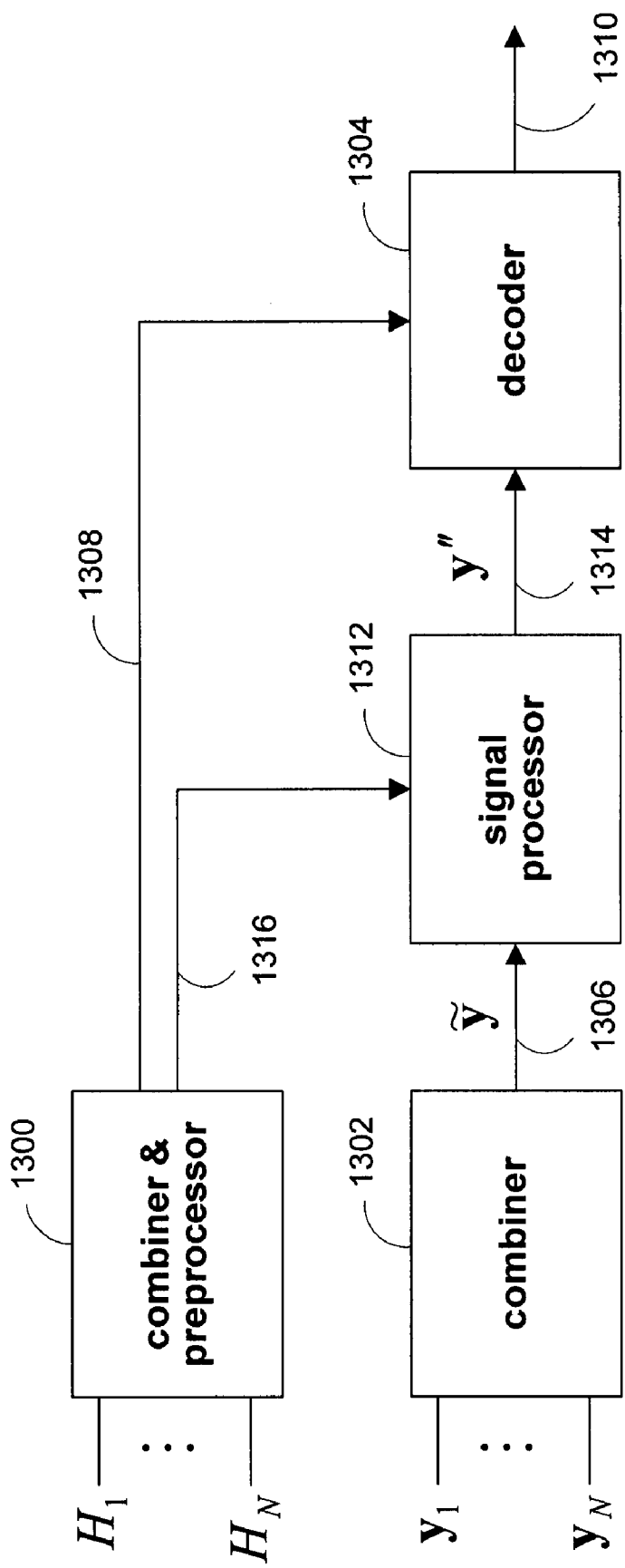
FIG. 13 is a block diagram of a receiver that combines incoming vectors, processes the combined vector, and decodes the vector.

Therefore, FIG. 13 is a block diagram of a simplified implementation of a receiver (e.g., receiver 112) that may use a single decoder for any value of N. FIG. 13 differs from FIG. 7 for at least the reason that FIG. 13 has signal processor 1314 between combiner 1302 and decoder 1304. With proper design of signal processor 1312, processed signal vector 1314 may be such that it can be decoded by a single decoder regardless of the value of N. In particular, the signal processing techniques enable decoder 1304 to implement only the decoder for N=1, when no combining is necessary. The decoder used for N=1 is hereafter called a basic decoder, and the decoder used for any integer N>1 is hereafter referred to as a general decoder.

Two detailed embodiments of FIG. 13 are disclosed below to illustrate the use of signal processing to enable reuse of the basic decoder. One embodiment processes a signal vector based on information from the QR decomposition of a channel matrix, and decodes the processed signal with maximum-likelihood decoding. The other embodiment utilizes zero-forcing (ZF) equalization, followed by a simple, linear decoder. This simple decoder will be referred to as a zero-forcing decoder. Maximum-likelihood decoding and zero-forcing equalization and decoding represent two strategies that may be used in the present invention. The present invention, however, is not limited to any particular type of signal processing or decoding. For example, a minimum mean squared error (MMSE) equalizer/decoder may also be used. As shown below for ML and ZF, each of these decoding strategies implements potentially different signal processing in order to enable reuse of the basic decoder. To show that the decoder is capable of reuse for all N, the basic decoder for each of the following systems is described first. Then, the general decoder is described and shown to be the same as the basic decoder.

Figure 14:
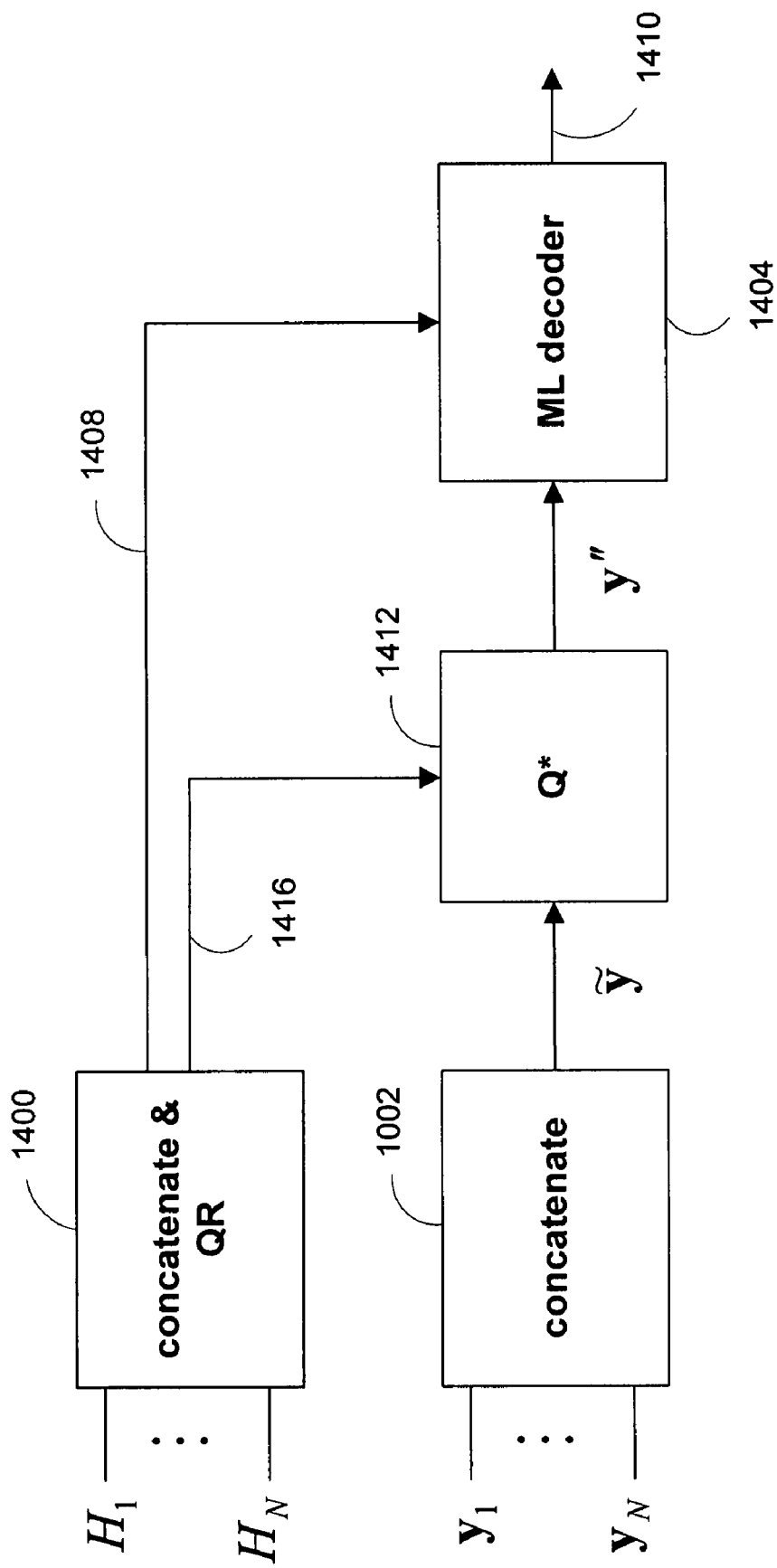
FIG. 14 is one embodiment of FIG. 13, where the receiver performs QR decomposition of the combined channel matrix and maximum-likelihood decoding.

FIG. 14 is a block diagram for ML decoding of processed received signals. The channel matrix is first concatenated and preprocessed by combiner/preprocessor 1400. In this case, pre-processing involves factoring the combined channel matrix into a matrix with orthogonal columns, Q, and a square, upper-triangular matrix R. Matrices Q and R are used by signal processor 1412 and decoder 1404. The advantage of applying QR factorization to the channel matrix will become apparent below.

When only one signal vector has been received by the system in FIG. 14, concatenation by combiners 1400 and 1402 is simple. The received signal can be represented as $$y_1 = H_1 x + n_1 \quad (9)$$
$$= Q_1 R_1 x + n_1. \quad (10)$$

Using the channel information provided by combiner/preprocessor 1400, signal processor 1412 multiplies the received vector by $Q^*_1$, where $Q^*_1$ is the transpose of $Q_1$, yielding $$Q^*_1 y_1 = Q^*_1 Q_1 R_1 x + Q^*_1 n_1 \quad (11)$$
$$= R_1 x + Q^*_1 n_1 \quad (12)$$

Equation (12) follows from equation (11) because $Q^*_1 Q_1 = I_{Nt}$, where $I_{Nt}$ is the $N_t \times N_t$ identity matrix, when $Q_1$ has orthonormal columns.

Since only one vector is received by the receiver in FIG. 14, decoder 1404 is a basic decoder. Using the $N_t \times 1$ signal vector $Q^*_1 y_1$, basic decoder 1404 estimates the $N_t \times 1$ common transmitted vector x. Decoder 1404 may still implement the same decoding scheme as basic decoder 1004, except decoder 1404 picks a valid transmit signal vector x that minimizes $Q^*_1 n_1$ The decoder metric, therefore, is $\|Q^*_1 y_1 - R_1 x\|^2$.

When multiple signal vectors (N>1) have been received by the system in FIG. 14, the N channel matrices and N received vectors are concatenated by combiners 1400 and 1402, respectively. The concatenation operation is shown in equations (4) and (6) for the channel matrices and received vectors, respectively. Equation (6) is reproduced in equation (13) for convenience. In addition to concatenation, combiner/preprocessor 1400 performs QR decomposition on the combined channel matrix. That is, it determines the values of $\tilde{Q}$ and $\tilde{R}$ in $$\tilde{H} = [H_1^T H_2^T \ldots H_N^T]^T \quad (13)$$
$$= \tilde{Q}\tilde{R}, \quad (14)$$

where $\tilde{Q}$ is an $NN_r \times N_t$ matrix with orthogonal columns, and $\tilde{R}$ is an $N_t \times N_t$ upper triangular matrix. Accordingly, concatenated received signal vector 1406 can be represented as $$\tilde{y} = \tilde{H} x + \tilde{n} \quad (15)$$
$$= \tilde{Q}\tilde{R} x + \tilde{n}, \quad (16)$$

where $\tilde{Q}$ and $\tilde{R}$ are defined in equation (14) and $\tilde{n}$ is a noise vector defined in equation (5). Following concatenation, signal processor 1412 multiplies concatenated received vector 1406 by $\tilde{Q}^*$, yielding $$\tilde{Q}^* \tilde{y} = \tilde{Q}^* \tilde{Q} \tilde{R} x + \tilde{Q}^* \tilde{n} \quad (17)$$
$$= \tilde{R} x + \tilde{Q}^* \tilde{n} \quad (18)$$

Since multiple vectors have been received by the receiver in FIG. 14, ML decoder 1404 is a general decoder. Similar to the basic decoding case, general ML decoder 1404 picks the vector x that minimizes the metric, $\|\tilde{Q}^* \tilde{y} - \tilde{R} x\|^2$.

There is no loss of information from the operation performed by equalizer 1412, namely multiplying equation (16) by $\tilde{Q}^*$. This is because the $N_t$ columns of $\tilde{Q}$, which span the same space as the columns of $\tilde{H}$, can be thought of as an $NN_r$-dimensional orthonormal basis for the $N_t$ dimensional subspace where the transmitted signal lies. By multiplication of $\tilde{Q}^*$, the dimension of the signal and noise vectors are reduced from $NN_r$ to $N_t$. The dimension of the transmitted signal vector was originally $N_t$, so there is no loss of information from the multiplication by $\tilde{Q}^*$. Furthermore, the noise parts lying in the reduced dimension do not affect the decoding process. Therefore, since FIG. 14 uses an optimal, ML decoder, the system has optimal performance.

Because of the multiplication by $\tilde{Q}^*$, which is performed by signal processor 1412, the size of the signal processor output, vector 1414 or y", is reduced to $N_t$. This is the same dimension as when only one signal vector is received. Therefore, the dimension of the input to ML decoder 1404 for N>1 is the same as the dimension of the basic decoder, which enables the same decoder to be used for arbitrary N. Thus, by processing the combined signal with $\tilde{Q}^*$ prior to decoding, the complexity of decoder 1404 may be drastically reduced.

Figure 15:
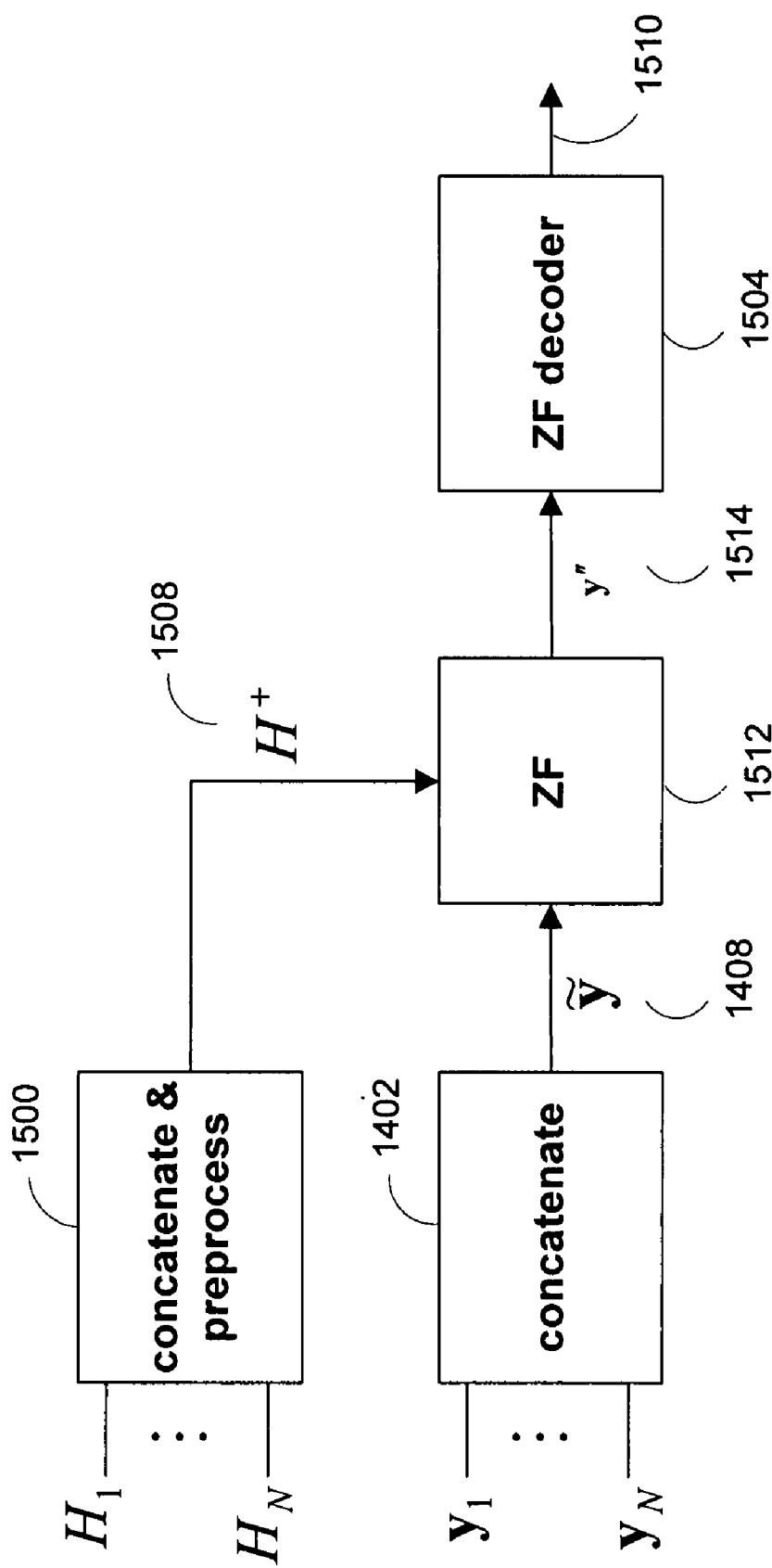
FIG. 15 is one embodiment of FIG. 14, where the receiver uses zero-forcing equalization and decoding.

A second embodiment of the block diagram in FIG. 13 is shown in FIG. 15. The block diagram in FIG. 15 uses zero-forcing (ZF) equalization and decoding. Zero-forcing is a technique used to ideally eliminate the effect of a channel, H, from a received vector, y, by multiplying the received vector by the channel inverse, $H^{-1}$. The result is generally a signal similar to the transmitted signal, but with correlated and amplified noise. Thus, a zero-forcing decoder is a non-optimal form of decoding. However, it is effective in many circumstances and has much lower complexity than ML decoding.

When only one signal vector has been received by the system in FIG. 15, concatenation by combiner 1402 is simple, and signal vector 1408 is simply $y_1$, where $$y_1 = H_1 x + n_1. \quad (19)$$

Concatenation by combiner/preprocessor 1500 is also trivial. However, combiner/preprocessor 1500 also preprocesses channel matrix 1508, which is simply $H_1$ in this case, to supply appropriate information to signal processor 1512. In particular, it determines the pseudo-inverse of the channel matrix, $H_1^+$. Signal processor 1512 uses the inverse to perform zero-forcing equalization on vector 1408. It multiplies vector 1408 by $H_1^+$, yielding $$H_1^+ y_1 = H_1^+ H_1 x + H_1^+ n_1 \quad (20)$$
$$= x + H_1^+ n_1. \quad (21)$$

Note from equation (21) that equalizer 1512 produces the transmitted signal, x, with additive, potentially correlated noise.

Since only one signal vector is received by FIG. 15, ZF decoder 1504 is a basic decoder. Using $H^+ y_1$ and ignoring the correlation between the noise components, basic ZF decoder 1504 may estimate the $N_t \times 1$ common transmitted signal vector, x.

One valuable aspect of the zero-forcing technique employed by the system in FIG. 15 comes from the fact that each component of 1514 may be decoded separately. For an ML decoding scheme, such as the one shown in FIG. 14, the decoder has to consider the transmitted vector as a whole in order to calculate $\|\tilde{y}-\tilde{H}x\|^2$. Instead, to estimate the $k^{th}$ component of x, decoder 1510 implements a method to calculate the metric, $$\frac{|[H_1^+ y_1]_k - [x]_k|^2}{[H_1^+ H_1^{+*}]_{k,k}} \tag{24}$$

The subscript k indexes the kth element of a vector, and the subscript k,k indexes the $(k,k)^{th}$ element of a matrix. Since x has a dimension of $N_t$, k takes on the values $1, \ldots, N_t$, and the metric is implemented for each of the $N_t$ signals.

Now considering the case with N received signal vectors ($N \geq 2$), the channel model can again be expressed as $$\tilde{y} = \tilde{H}x + \tilde{n}, \tag{25}$$

where the components of equation (25) are shown more clearly in FIG. 12. $\tilde{y}$ is obtained by the system in FIG. 15 by combiner 1402 and $\tilde{H}$ is obtained by combiner/preprocessor 1500. In addition, combiner/preprocessor 1500 preprocesses $\tilde{H}$ to supply appropriate information to zero-forcing equalizer 1512. In particular, it calculates the pseudo-inverse of $\tilde{H}$, $\tilde{H}^\dagger$, where $\tilde{H}^\dagger = (\tilde{H}^* \tilde{H})^{-1} \tilde{H}^*$.

The zero-forcing equalizer 1512 may attempt to recover the transmitted signal vector by multiplying the received vector in equation (25) by the pseudo-inverse, $\tilde{H}^\dagger$. The result of the equalizer is $$\tilde{H}^\dagger \tilde{y} = \tilde{H}^\dagger \tilde{H}x + \tilde{H}^\dagger \tilde{n} \tag{26}$$
$$= x + \tilde{H}^\dagger \tilde{n}. \tag{27}$$

Note from equation (27) that equalizer 1512 produces the transmitted signal, x, with additive, potentially correlated noise.

Since the receiver of FIG. 15 has multiple received vectors, zero-forcing decoder 1504 is a general decoder. The general ZF decoder estimates the $N_t \times 1$ transmitted signal vector, x, from the $N_r \times 1$ processed signal vector, y", and ignoring the correlation between the noise components. Similar to the basic decoding case, to estimate the kth component of x, the decoder implements a method to calculate the metric, $$\frac{|[\tilde{H}^\dagger \tilde{y}]_k - [x]_k|^2}{[\tilde{H}^\dagger \tilde{H}^{\dagger *}]_{k,k}}, \tag{29}$$

The subscript k indexes the $k^{th}$ element of a vector, and the subscript k,k indexes the $(k,k)^{th}$ element of a matrix. Since x has a dimension of $N_t$, k takes on the values $1, \ldots N_t$, and the metric is implemented for each of the $N_t$ signals.

Because of the multiplication by $\tilde{H}^\dagger$ performed by signal processor 1512, the size of the signal processor output, vector 1514 or $\tilde{H}^\dagger \tilde{y}$, may be reduced to $N_t$. This is the same dimension as when only one signal vector is received. Therefore, the dimension of the input to ML decoder 1504 for N>1 is the same as the dimension of the basic decoder, which enables the same decoder to be used for arbitrary N. Thus, by processing the combined signal with $\tilde{H}^\dagger$ prior to decoding, the complexity of the decoder 1504 may be drastically reduced.

Similar to the ML case above, QR decomposition may also be performed on the channel matrix in the zero-forcing case to reduce computation complexity. Before combiner/preprocessor 1500 computes the pseudo-inverse of the combined channel matrix, it factors the matrix, $\tilde{H}$, into a matrix with orthogonal columns, $\tilde{Q}$, and a square, upper-triangular matrix $\tilde{R}$:

$$\tilde{H} = [H_1^T H_2^T \ldots H_N^T]^T \tag{30}$$
$$= \tilde{Q}\tilde{R}, \tag{31}$$

Following QR decomposition, combiner/preprocessor 1500 calculates the inverse of $\tilde{Q}\tilde{R}$, which is $\tilde{R}^{-1}\tilde{Q}^*$.

Signal processor uses the inverse to perform zero-forcing equalization on vector 1408. It multiplies vector 1408 by $\tilde{R}^{-1}\tilde{Q}^*$, yielding $$\tilde{R}^{-1}\tilde{Q}^* \tilde{y} = \tilde{R}^{-1}\tilde{Q}^* \tilde{Q}\tilde{R}x + \tilde{R}^{-1}\tilde{Q}^* \tilde{n} \tag{32}$$
$$= x + \tilde{R}^{-1}\tilde{Q}^* \tilde{n} \tag{33}$$

Accordingly, the metric implemented by decoder 1504 becomes $$\frac{|[\tilde{R}^{-1}\tilde{Q}^* \tilde{y}]_k - [x]_k|^2}{[\tilde{R}^{-1}\tilde{R}^{-*}]_{k,k}} \tag{34}$$

The subscript k indexes the $k^{th}$ element of a vector, and the subscript k,k indexes the $(k,k)^{th}$ element of a matrix. Since x has a dimension of $N_t$, k takes on the values $1, \ldots, N_t$, and the metric is implemented for each of the $N_t$ signals.

Any of the embodiments of the present invention may decompose a combined channel matrix by QR decomposition. For example, any of preprocessors 1300, 1400, and 1500 of FIGS. 13, 14, and 15 may perform QR decomposition. A preprocessor may implement any suitable algorithm for decomposing a combined channel matrix. In some embodiments, a preprocessor may implement Gram-Schmitt orthogonalization. Gram-Schmitt orthogonalization is a technique that obtains a Q matrix by systematically orthogonalizing the columns of a combined channel matrix. In other embodiments, a preprocessor may perform decomposition based on Householder reflections or Given's rotations. These techniques can be used to systematically triangularize a combined channel matrix to obtain an upper triangular matrix, R. Given's rotations may be implemented using coordinate rotation digital calculation (CORDIC). CORDIC is an algorithm for computing trigonometric functions, such as rotation functions, that uses only simple shift-add operations. Thus, CORDIC may be used when more complex functions, such as multiplications, cannot easily be implemented (e.g., in FPGAs).

Figure 16:
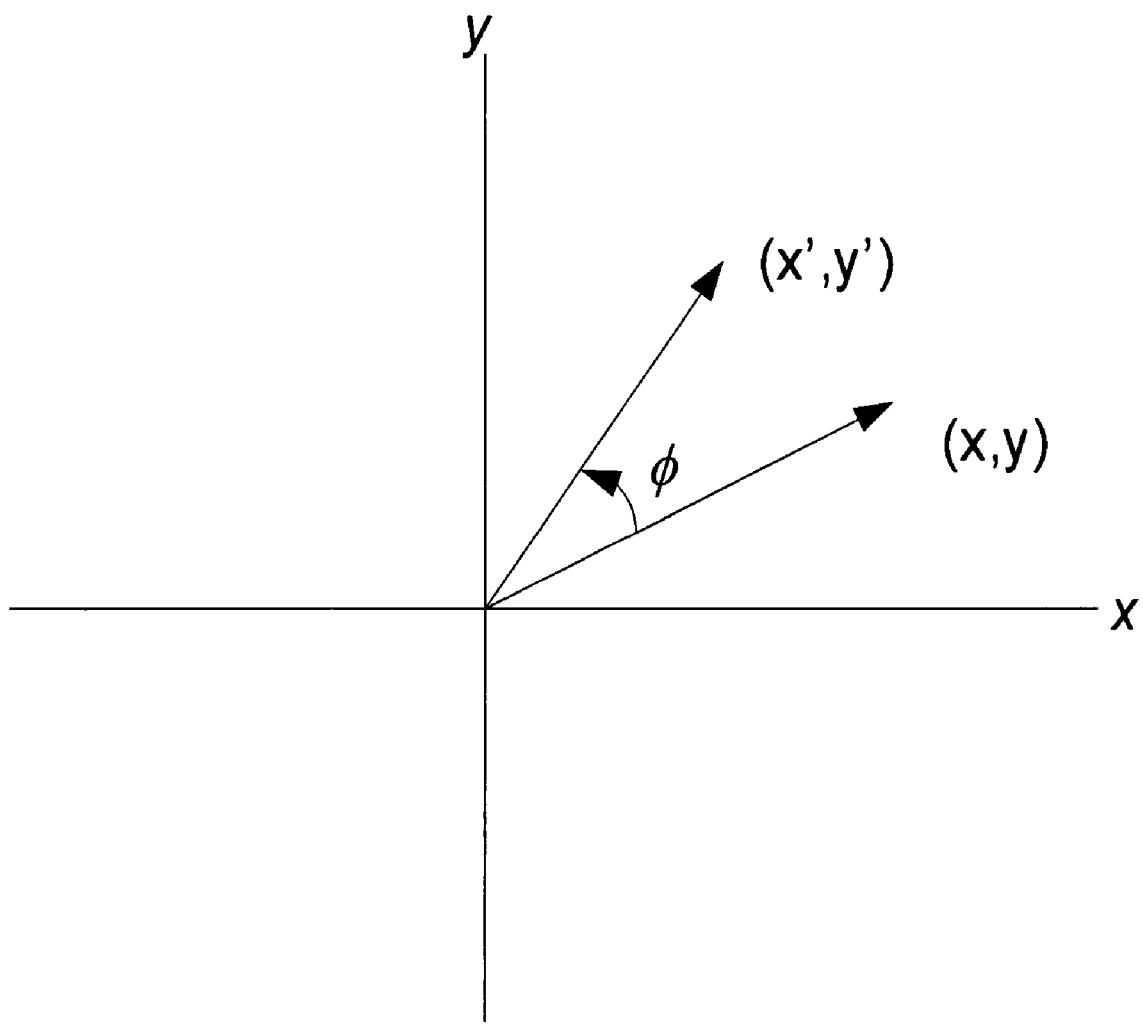
FIG. 16 is an illustration of a Given's rotation.

A Given's rotation may rotate a two-dimensional vector by a certain angle. For example, a Given's rotation may be used to rotate components within a combined channel matrix. FIG. 16 shows an illustration of a Given's rotation. A vector with coordinates (x,y) may be rotated by an angle, φ, to produce a new vector with coordinates (x',y') according to, $$\begin{bmatrix} x' \\ y' \end{bmatrix} = \begin{bmatrix} \cos\phi & -\sin\phi \\ \sin\phi & \cos\phi \end{bmatrix} \cdot \begin{bmatrix} x \\ y \end{bmatrix}, \tag{35}$$

Thus, to perform a rotation by $\phi$, the original vector may be multiplied by a rotation matrix, where the rotation matrix is given by the matrix of sines and cosines in equation (35). In general, a matrix usable for a Given's rotation can take the form, $$\begin{bmatrix} c & -s \\ s & c \end{bmatrix},$$

where the columns have a magnitude of one, and the components of the columns are perpendicular. Thus, a Given's rotation matrix is a unitary and orthogonal, or orthonormal, matrix. Orthonormal matrices are usable for rotating vectors, because applying an orthonormal matrix to a vector changes the angle of the vector without changing its magnitude. Clearly, the columns of the matrix in equation (35) have unit magnitude and have normal components.

Figure 17A:
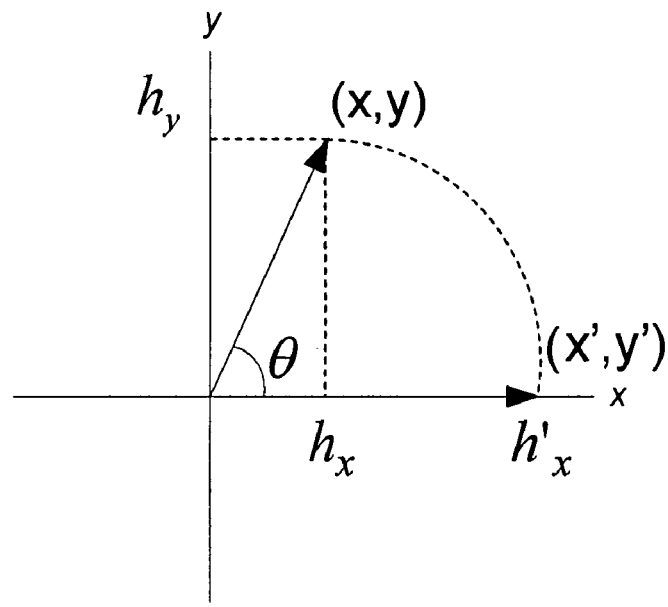
FIG. 17A shows a Given's rotation on an x-y axis.

In the present invention, a Given's rotation may be applied to any type of two-component unit. Referring to FIG. 17A, the two-component unit may be an (x,y) vector in a real x-y plane. In this case, a Given's rotation may be used to rotate the vector onto the x-axis. The resulting vector, (x',y'), and the angle of rotation, $\theta$, may be given by, $$x'=h'_x=\sqrt{h_x^2+h_y^2} \tag{36}$$

$$y'=0 \tag{37}$$

$$\theta=\tan^{-1}(h_y/h_x) \tag{38}$$

The angle, $\theta$, will hereinafter represent a Given's rotation angle that rotates a two-dimensional real vector onto an axis.

Figure 17B:
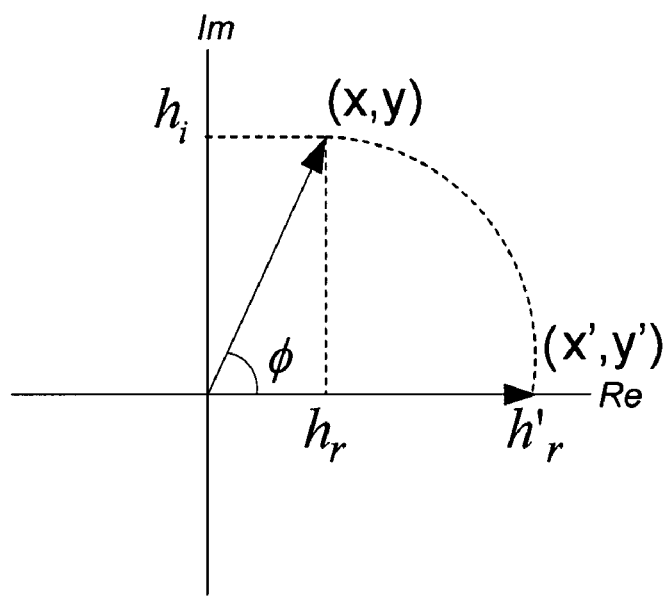
FIG. 17B shows a Given's rotation on a complex number plane.

A Given's rotation may be used to rotate a complex number by an angle on a complex number plane. FIG. 17B shows a complex number, represented by vector (x,y), on a complex number plane. The complex number is shown to have a real part equal to $h'_x$, and an imaginary part equal to $h'_y$. A Given's rotation may be used to rotate the complex number onto the real axis. The resulting vector, (x',y'), and the angle of rotation, $\phi$, may be given by, $$x'=h'_r=\sqrt{h_r^2+h_i^2} \tag{39}$$

$$y'=0 \tag{40}$$

$$\phi=\tan^{-1}(h_i/h_r) \tag{41}$$

Therefore, without a non-zero imaginary component, the resulting vector is a real number with a magnitude of $h'_r$. The angle, $\phi$, will hereinafter represent a Given's rotation angle for a rotation of a complex number onto the real axis.

A matrix of complex components can be converted into an upper triangular matrix of real components using the two types of Given's rotations described above in FIGS. 17A and 17B. FIG. 18 shows a detailed example of converting a 2×2 matrix into an upper triangular matrix using four Given's rotations. The 2×2 matrix to be converted is given by matrix A. First, components $a_{11}$ and $a_{21}$ in the left column of matrix A can be made into real numbers by rotating them by $\phi_1$ and $\phi_2$ in the complex number plane. These Given's rotations produce matrix 1802, where new components $a'_{11}$ and $a'_{21}$ in are real numbers. The components in the right column of matrix 1802 are unchanged from the rotations and may therefore still be complex. Thus, up to this point, matrix A has been decomposed into matrix 1802 and a Given's rotation matrix corresponding to rotations by $\phi_1$ and $\phi_2$.

To convert matrix 1802 of FIG. 18 into an upper triangular matrix, the bottom left component of matrix 1802 should be set to zero. Thus, the left column of matrix 1802 may treated as a two-dimensional column vector, $(a'_{11}, a'_{21})$, and may be rotated by angle $\theta_1$ using a Given's rotation matrix, $$\begin{bmatrix} \cos\theta_1 & -\sin\theta_1 \\ \sin\theta_1 & \cos\theta_1 \end{bmatrix}.$$

With this rotation matrix, the left column vector of matrix 1802 is converted to a vector with a real value and a zero value, represented as $(r_{11}, 0)$. The right column of matrix 1802 is also affected by the rotation matrix. Therefore, right column vector $(h_{12}, h_{22})$, is rotated into a vector, $(r_{12}, h'_{22})$. Vectors $(h_{12}, h_{22})$ and $(r_{12}, h'_{22})$, consequently, represent the columns of matrix 1804. Thus, up to this point, matrix A has been decomposed into matrix 1804 and a Given's rotation matrix corresponding to rotations of $\phi_1$, $\phi_2$, and $\theta_1$.

Matrix 1804 may be an upper triangular matrix with one complex component. Thus, matrix 1804 can be converted into a matrix with real values by one final rotation. A Given's rotation of angle $\phi_3$ may be used to rotate complex component $h'_{22}$ of matrix 1804 onto the real axis. This operation produces matrix R, an upper triangular matrix with diagonal components. Thus, FIG. 18 illustrates the decomposition of matrix A into upper triangular matrix R and a Given's rotation matrix corresponding to rotations of $\phi_1$, $\phi_2$, $\theta_1$, and $\phi_3$.

In FIG. 18, complex matrix A is converted into a real, upper triangular matrix, R. That is, the four Given's rotations illustrated in FIG. 18 systematically compute $$R=Q^*A \tag{42}$$

where Q* represents the Given's rotation matrix corresponding to rotations of $\phi_1$, $\phi_2$, $\theta_1$, and $\phi_3$. For simplicity, this Q* matrix will hereinafter be expressed as $Q^* \Leftarrow \{\phi_1, \phi_2, \theta_1, \phi_3\}$. Equation (42) may be manipulated to, $$A=QR, \tag{43}$$

a standard representation of a QR decomposition. Therefore, the Given's rotations of FIG. 18 illustrates a QR decomposition of a 2×2 matrix.

Where appropriate, any embodiment or aspect of the invention may be described below using a 2×2 MIMO system as an example. It should be understood that these examples are merely illustrative, and that any of the examples may be extended to a MIMO system of any suitable dimension.

Figure 19A:
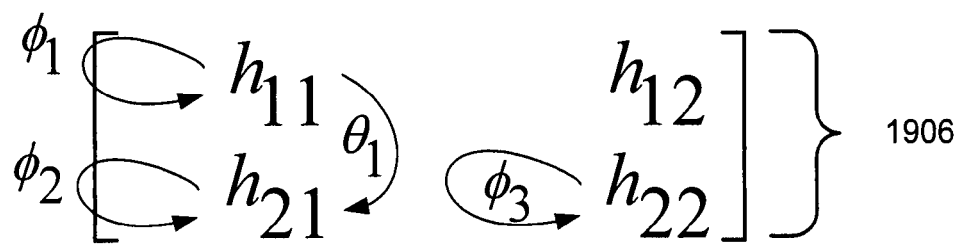
FIGS. 19A and 19B illustrate QR decompositions of combined channel matrices for an Nt=Nr=2 MIMO system.
Figure 19B:
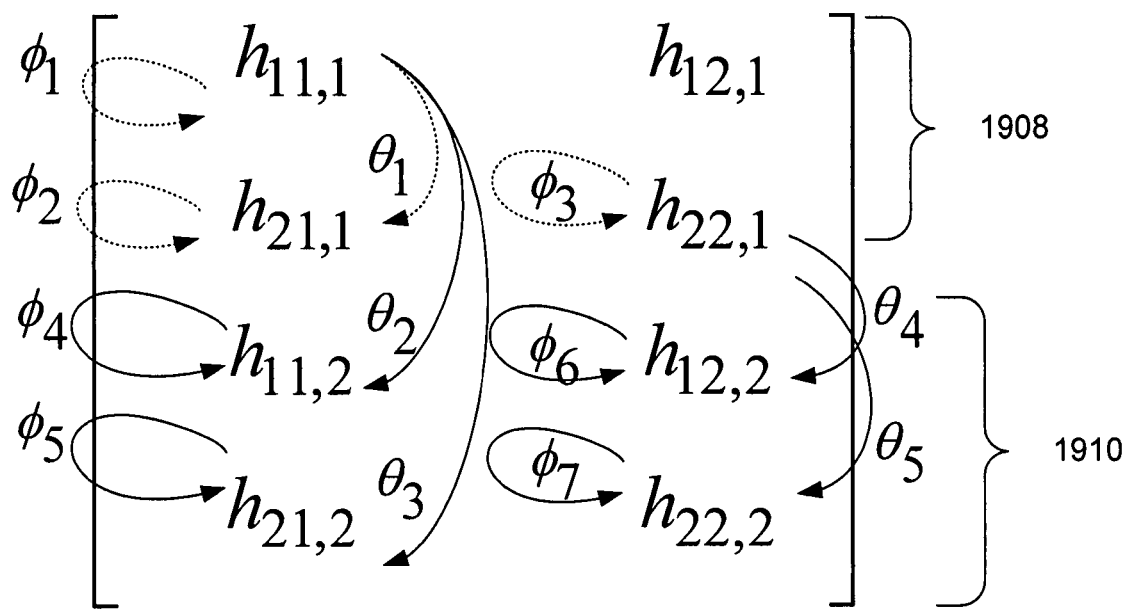

FIGS. 19A and 19B illustrate QR decompositions of combined channel matrices for N=1 and N=2, respectively. Referring first to FIG. 19A, matrix 1902 can represent a combined channel matrix when only one signal vector has been received. Thus, components 1906 of matrix 1902 correspond to the components of a channel response matrix, $H_1$, for a first received signal vector (e.g., received by combiner 1402 of FIG. 14). A preprocessor (e.g., preprocessor 1400 of FIG. 14) may perform the four Given's rotations shown in FIG. 19A to decompose combined channel matrix 1902 into an upper triangular matrix. These rotations are the rotations of FIG. 18, but in condensed form. Thus, to decompose a combined channel matrix, the preprocessor may rotate combined channel matrix 1902 with a rotation matrix of $Q^*_1 \Leftarrow \{\phi_1, \phi_2, \theta_1, \phi_3\}$.

Referring now to FIG. 19B, matrix 1904 can represent a combined channel matrix for two received signal vectors. That is, components 1908 and 1910 may correspond to the components of channel response matrices $H_1$ and $H_2$ associated with first and second received signal vectors, respectively. To decompose combined channel matrix 1904, a preprocessor (e.g., preprocessor 1400 of FIG. 14) may perform the 12 Given's rotations illustrated in FIG. 19B. Thus, the preprocessor may rotate combined channel matrix 1904 with a rotation matrix of $Q^*_2 \Leftarrow \{\phi_1, \phi_2, \theta_1, \phi_3, \phi_4, \phi_5, \theta_2, \theta_3, \phi_6, \phi_7, \theta_4, \theta_5\}$.

Figure 23:
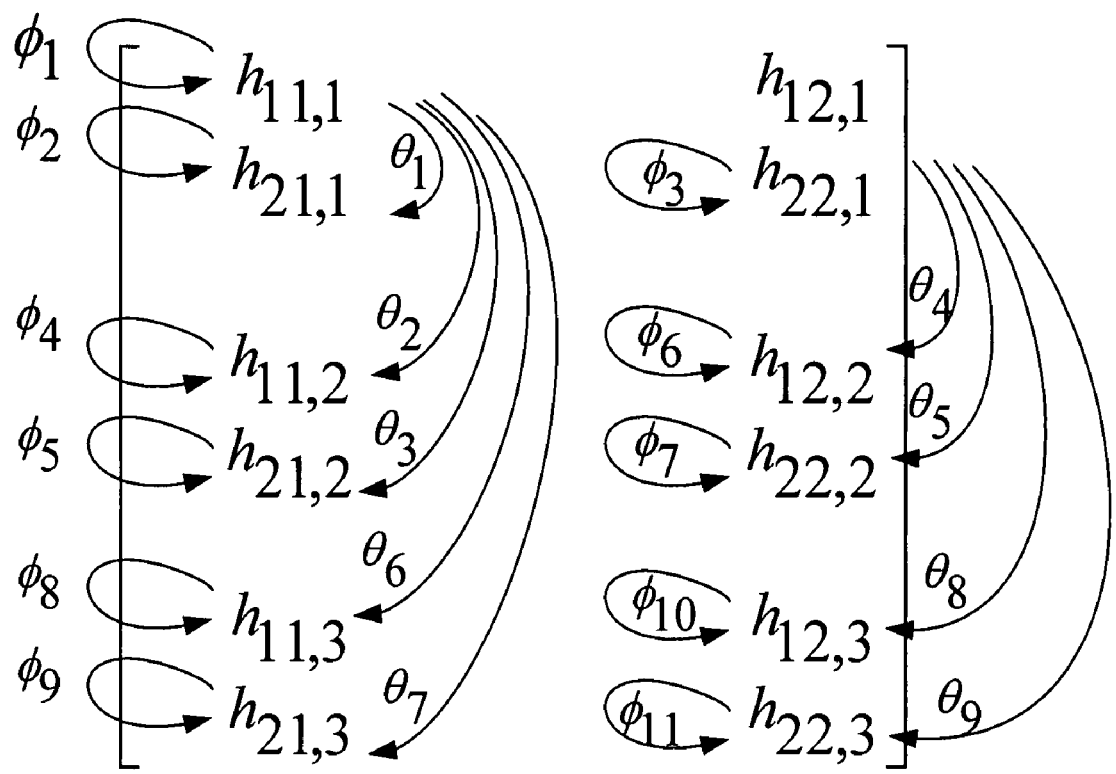

As shown in FIGS. 19A and 19B, the number of operations used to decompose a 4×2 combined channel matrix is considerably greater than the number of operations used to decompose a 2×2 matrix. In particular, matrix 1902 of FIG. 19A fully decomposes after four rotations, while matrix 1904 of FIG. 19B fully decomposes after 12 rotations. Generally, as the number of received signal vectors increases, the number of rotations necessary to decompose a combined channel response matrix increases. In fact, and as shown in FIG. 23, a combined channel matrix with three channel response matrices may need up to 20 Given's rotations to fully decompose into an upper triangular matrix. The number of Given's operations increases as N increases at least because the combined channel matrix has more components to operate on. For example, in FIG. 19B, rotations $\phi_1$, $\phi_2$, $\theta_1$, and $\phi_3$ (shown by dotted lines for emphasis) are the same operations performed on the 2×2 combined channel matrix of FIG. 19A. These operations may be necessary for decomposing any 2×2 matrix or any 2×2 submatrix within a larger matrix. In addition to these four rotations, eight other rotations are performed because of the 2×2 increase in the size of the combined channel matrix from FIG. 19A to FIG. 19B. Therefore, a channel preprocessor (e.g., preprocessor 1400 in FIG. 14) may need to have the capacity to process large matrices in the event that N is large. Because of device limitations and other design tradeoffs, the capacity of the channel preprocessor may be limited. Thus, in some embodiments, the preprocessor may not be able to process a combined channel matrix if over a certain number of signal vectors are received.

A similar issue may arise due to the potentially large size of a combined received signal vector, $\tilde{y}$. The number of operations necessary for processing a combined signal vector may increase drastically as N increases. In particular, the number of operations to compute a multiplication of an $N_r \times NN_r$ $\tilde{Q}^*$ matrix and an $NN_r$-dimensional combined signal vector may be large for large N. This is a processing operation that may be performed by signal processor 1412 in FIG. 14. Thus, due to device limitations and other design tradeoffs, the capacity of such a signal processor may be limited to a certain value of N.

In addition to implementing a channel preprocessor (e.g., preprocessor 1400 in FIG. 14) that may process large matrices, the channel preprocessor may need to implement a different channel preprocessor for each N in order to handle the variable dimensions of a combined channel matrix. Similarly, a signal processor (e.g., signal processor 1412 in FIG. 14) may need to implement a different signal processor for each N in order to handle the variable sized combined signal vector. Because it would be impractical and impossible to implement a channel preprocessor and signal processor for every N, the flexibility of the receiver would again be limited.

Furthermore, if a sequential protocol (e.g., HARQ) is used or if the signal vectors are processed sequentially (e.g., using a serial repetition code), in some embodiments, the receiver may need to store each received signal vector and channel response matrix to use in future calculations. For example, to form combined channel matrix 1904 in FIG. 19, components 1908 from a first transmission may need to be stored. Thus, when a second signal vector is received, components 1908 may be recalled from storage and combined with a current channel response matrix. For larger MIMO systems where $N_t > 2$ and/or $N_r > 2$, or if a large number of signal vectors is received, the amount of storage capacity needed by a receiver may be substantial. Therefore, in some embodiments, the capabilities of a receiver may be limited by both the processing capabilities and the storage capacity of the receiver.

Accordingly, the present invention discloses techniques for performing CASLC combining that has low complexity and/or low storage requirement. In fact, in some embodiments of the present invention, the complexity or amount of necessary computations does not depend on the number of received signal vectors. Therefore, not only do these embodiments have decoders that are flexible to the number of received signal vectors, other components in a receiver (e.g., combiners and preprocessors) may also be made to be flexible. Accordingly, these embodiments may be completely scalable for different values of $N_t$, $N_r$, and N.

Figure 20:
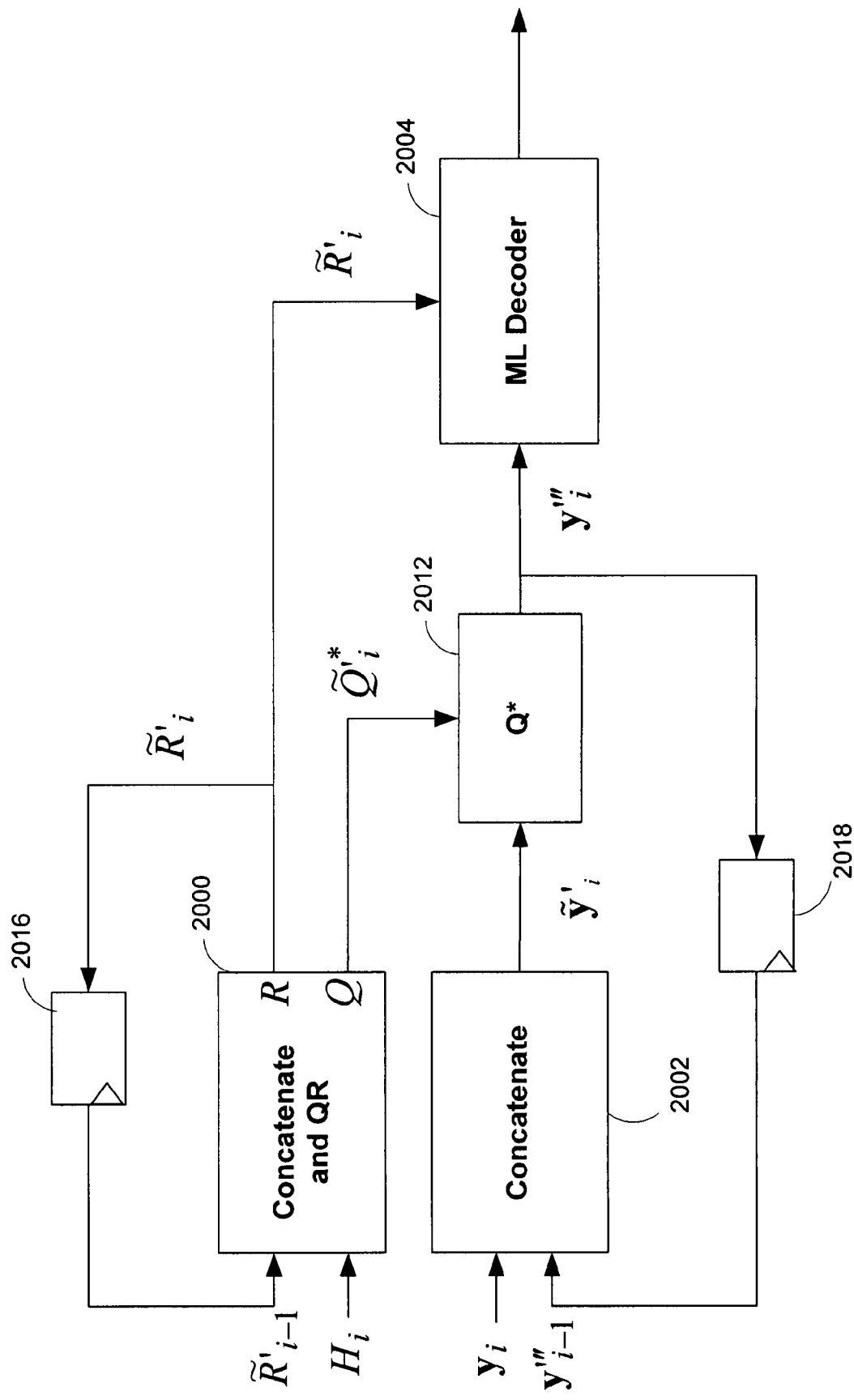
FIGS. 20-21 are block diagrams of MIMO receivers that sequentially process received signal vectors.

FIG. 20 shows an illustrative block diagram that can be used to implement a scalable, CASL combining receiver. Due to a general similarity in structure to the receiver configuration of FIG. 14, any signal vectors or matrices "X" that differ from those described above with respect FIG. 14 will be referred to as "X'" (note the apostrophe) to distinguish from FIG. 14. FIG. 20 shows a receiver configuration that processes received signal vectors sequentially. Thus, this receiver configuration may be used with any sequential protocol (e.g., HARQ, sequential repetition code, etc.). For simplicity, the operation of FIG. 20 will be described in terms of a HARQ protocol or any other protocol that receives signal vectors one-by-one.

When a first signal vector is received by the block diagram of FIG. 20, no previous information about the common transmit signal vector is available. Thus, channel preprocessor 2000 may directly process the channel matrix associated with the first received signal vector. Channel preprocessor 2000 may process the channel matrix by decomposing the matrix using QR decomposition.

For i received signal vectors, where i>1, channel preprocessor 2000 may concatenate two matrices to form a $(N_r + N_t) \times N_t$ combined channel matrix—an $N_t \times N_t$ $\tilde{R}'_{i-1}$ matrix from decomposing the previous combined channel matrix (if available), and an $N_r \times N_t$ channel response matrix corresponding to the ith received signal vector. That is, for i received signal vectors, channel preprocessor 2000 forms a combined channel matrix given by, $$\tilde{H}'_i = \begin{bmatrix} \tilde{R}'_{i-1} \\ H_i \end{bmatrix}. \tag{44}$$

$\tilde{R}'_{i-1}$ may include any relevant information associated with each previous channel matrix (e.g., $H_1, \ldots, H_{i-1}$). Thus, rather than concatenating each of these previous channel matrices, $\tilde{R}'_{i-1}$ may be included in a combined channel matrix without any loss of information. Using $\tilde{R}'_{i-1}$ in a combined channel matrix results in a considerably smaller combined channel matrix. In particular, $\tilde{R}'_{i-1}$ has dimensions of $N_t \times N_t$, which may be considerably smaller than $(i-1)N_r \times N_t$, the dimension of a matrix concatenation of $H_1, \ldots, H_{i-1}$. Furthermore, for i>1, the dimension of $\tilde{R}'_{i-1}$ does not depend on the number received signal vectors, and is therefore easily able to handle different values of N.

Channel preprocessor 2000 may perform QR decomposition on the combined channel matrix of equation (44). QR decomposition may produce an $N_t \times N_t$ upper triangular matrix $\tilde{R}'_i$ and an $(N_r + N_t) \times N_t$ orthonormal matrix $\tilde{Q}'_i$. Thus, $\tilde{R}'_i$ may include any relevant information from the first i channel matrices. As expected, the dimensions of $\tilde{R}'_i$ are the same as the dimensions of $\tilde{R}'_{i-1}$. Therefore, $\tilde{R}'_i$ may serve as the new $\tilde{R}'_{i-1}$ matrix when an (i+1)th signal vector is received, and would not increase the size of the combined channel matrix. In order for $\tilde{R}'_i$ to be available when the (i+1)th signal vector is received, $\tilde{R}'_i$ may be delayed or stored in delay block 2016.

Accordingly, for a single received signal vector, channel preprocessor 2000 may process a $N_r \times N_t$ channel matrix to form an $N_t \times N_t$ matrix. For more than one received signal vector, channel preprocessor 2000 may process a larger, $(N_r + N_t) \times N_t$ combined channel matrix to again form an $N_t \times N_t$ matrix. Therefore, channel preprocessor 2000 may implement a preprocessor for i=1, and another preprocessor for i>1. Alternatively, channel preprocessor 2000 may be a single signal processor that can process matrices of variable dimensions. Thus, in some embodiments of the present invention, up to two channel preprocessors may be implemented. This may be a considerable complexity and size improvement over the up to N channel preprocessors that may be implemented without this concatenation technique.

Signal vector combiner 2002 of FIG. 20 may similarly use previously computed information to create a combined received signal vector, $\tilde{y}'_i$. If only one signal vector has been received, the combined signal vector, $\tilde{y}'_1$, may simply be the received signal vector. When i signal vectors have been received, where i>1, signal vector combiner 2002 may concatenate an $N_r \times 1$ processed combined signal vector from a previous computation, namely $y'''_{i-1}$, with an ith received signal vector, $y_i$. Therefore, combiner 2002 can output a $(N_r + N_t) \times 1$ combined signal vector given by, $$\tilde{y}'_i = \begin{bmatrix} y'''_{i-1} \\ y_i \end{bmatrix}. \quad (45)$$

$y'''_{i-1}$ may include any relevant information associated with each previous received signal vector (e.g., $y_1, \ldots, y_{i-1}$). Thus, rather than concatenating each of these previous received signal vectors, $y'''_{i-1}$ may be included in a combined signal vector without any loss of information. Using $y'''_{i-1}$ in a combined signal vector results in a considerably smaller combined signal vector, $\tilde{y}'_i$. In particular, $y'''_{i-1}$ is an $N_r$-dimensional vector, and can be considerably smaller than concatenating (i-1) $N_r$-dimensional vectors. Furthermore, the dimension of $y'''_{i-1}$ does not depend on the number received signal vectors, and is therefore more flexible to different values of N.

The combined signal vector, $\tilde{y}'_i$, may be processed by signal processor 2012 using information obtained from channel preprocessor 2000. Signal processor 2012 may multiply combined signal vector $\tilde{y}'_i$ by $\tilde{Q}'^*_i$, the conjugate transpose of the $\tilde{Q}'_i$ matrix obtained from channel preprocessor 2000. Thus, when one signal vector has been received, the $N_r$-dimensional combined signal vector, $\tilde{y}'_1$, may be multiplied by an $N_r \times N_r$ $\tilde{Q}'^*_1$ vector to form an $N_r$-dimensional processed signal vector, $y'''_1$. When i signal vectors have been received, where i>1, the $(N_r + N_t)$-dimensional combined signal vector, $y'''_i$, may be multiplied by the $N_r \times (N_r + N_t)$ $\tilde{Q}'^*_i$ matrix to form an $N_r$-dimensional processed signal vector, $y'''_i$. Therefore, signal processor 2012 may implement a signal processor for i=1, and another signal processor for i>1. Alternatively, signal processor 2012 may be a single signal processor that may handle multiplications of variable dimensions. Thus, in some embodiments of the present invention, up to two signal processors may be implemented to process any number of received signal vectors. This may be a considerable complexity and size improvement over the up to N signal processors that may be implemented in other embodiments of the present invention.

A processed combined signal vector, $y'''_i$, from signal processor 2012 may be decoded by decoder 2004. Also, the processed combined signal vector may be delayed or stored in delay block 2018 to serve as the new $y'''_{i-1}$ matrix when the (i+1)th signal vector is received. Although delay blocks 2016 and 2018 are shown as separate entities in FIG. 20, they may also be implemented as a single delay block.

Decoder 2004 of FIG. 20 may be a maximum-likelihood decoder or any other suitable decoder. As described above in connection with FIG. 14, ML decoder 2004 may calculate a metric, $\|\tilde{Q}'^*\tilde{y}' - \tilde{R}'\hat{x}\|^2$ for each valid value of $\hat{x}$. For decoder 2004 to be a maximum-likelihood decoder, this metric should result in the same values as the metric, $\|\tilde{Q}^*\tilde{y} - \tilde{R}\hat{x}\|^2$, implemented by maximum-likelihood decoder 1404 from FIG. 14, for each valid value of $\hat{x}$. For the two metrics to produce the same values, processed signal vector $\tilde{Q}'^*\tilde{y}'$ should equal $\tilde{Q}^*\tilde{y}$, and $\tilde{R}'\hat{x}$ should equal $\tilde{R}\hat{x}$. To show that these values are the same, a 2×2 MIMO example will be described below. The example may be extended to any sized MIMO system. Therefore, the receiver of FIG. 20 may have the decoding performance of a true maximum-likelihood decoder regardless of the size of the system.

When two signal vectors have been received, a combined channel matrix, as previously described in connection with FIGS. 13, 14, and 15, includes channel response matrices $H_1$ and $H_2$. The combined channel matrix, $\tilde{H}$, can therefore be written as, $$\tilde{H} = \begin{bmatrix} H_1 \\ H_2 \end{bmatrix} = \begin{bmatrix} Q_1 R_1 \\ H_2 \end{bmatrix} = \begin{bmatrix} Q_1 & 0 \\ 0 & I \end{bmatrix} \begin{bmatrix} R_1 \\ H_2 \end{bmatrix} \tilde{Q}_2 \tilde{R}_2. \quad (46)$$

Thus, this concatenated channel matrix can be written in terms of a matrix that is a concatenation of $R_1 = \tilde{R}_1$ and $H_2$. $R_1$ may be the upper triangular matrix that was previously computed when only one signal vector was received, and $H_2$ is the channel matrix associated with the most recently received signal vector. Therefore, this matrix may be equivalent to the combined channel matrix, $$\tilde{H}' = \begin{bmatrix} R'_{i-1} \\ H_i \end{bmatrix} = \begin{bmatrix} R_1 \\ H_2 \end{bmatrix},$$

obtained by combiner 2000 in FIG. 20. Equation (46) may be solved for $\tilde{H}'$, yielding, $$\tilde{H}' = \begin{bmatrix} R_1 \\ H_2 \end{bmatrix} = \left( \begin{bmatrix} Q_1 & 0 \\ 0 & I \end{bmatrix}^* \tilde{Q}_2 \right) \tilde{R}_2 \equiv \tilde{Q}'_2 \tilde{R}'_2. \quad (47)$$

Therefore, the $\tilde{R}'_2$ matrix resulting from decomposing combined channel matrix $\tilde{H}_2'$ is equivalent to the $\tilde{R}_2$ matrix from decomposing combined channel matrix $\tilde{H}_2$. Accordingly, the second term of the decoding metric for decoders 1404 and 2004, namely $\tilde{R}\hat{x}$ and $\tilde{R}'\hat{x}$, respectfully, may be equal.

To compare the first term of the decoding metrics for decoder 1404 (FIG. 14) and decoder 2004 (FIG. 20), namely $\tilde{Q}^*\tilde{y}$ and $\tilde{Q}'^*\tilde{y}'$, respectively, the output of signal processors 1412 and 2012 may be compared. In FIG. 14, when two signal vectors have been received, a processed combined signal vector may be given by, $$y_2'' = \tilde{Q}_2^* \begin{bmatrix} y_1 \\ y_2 \end{bmatrix} \quad (48)$$

$$= \tilde{Q}_2'^* \begin{bmatrix} Q_1 & 0 \\ 0 & I \end{bmatrix}^* \begin{bmatrix} y_1 \\ y_2 \end{bmatrix} \quad (49)$$

$$= \tilde{Q}_2'^* \begin{bmatrix} \tilde{y}_1 \\ y_2 \end{bmatrix}. \quad (50)$$

$$= y_2''' \quad (51)$$

Thus, processed combined signal vector $y''=\tilde{Q}^*\tilde{y}$ may be equivalent to $y'''=\tilde{Q}'^*\tilde{y}'$. Accordingly, a receiver implementing the block diagram of FIG. 20 may have substantially equal decoding performance to a receiver implementing the block diagram of FIG. 14.

The receiver configuration of FIG. 20 has a low storage requirement. The size of storage 2016 and 2018 depends only on $N_r$ and $N_t$, and not on N. In particular, storage 2016 may store less than $N_r \times N_t$ values. At any given time, the at most $N_r \times N_t$ storage spaces may be used to store the non-zero components of the most recently computed upper triangular matrix, $\tilde{R}'_i$. For 2×2 MIMO systems, an $\tilde{R}'_i$ matrix has only three non-zero values. Therefore, in this case, storage 2016 may have a three-value capacity. Similarly, storage 2018 may be sized to store $N_t$ values. At any given time, these $N_t$ spaces may be used to store the $N_t$ components of the most recently computed processed combined signal vector, $y'''_i$. Accordingly, the storage requirement of both storage 2016 and 2018 may be relatively low. Furthermore, because the storage requirement does not depend on N, the decoding, processing, and/or combining capabilities of the receiver is not limited by the storage capacity of the receiver.

Figure 21:
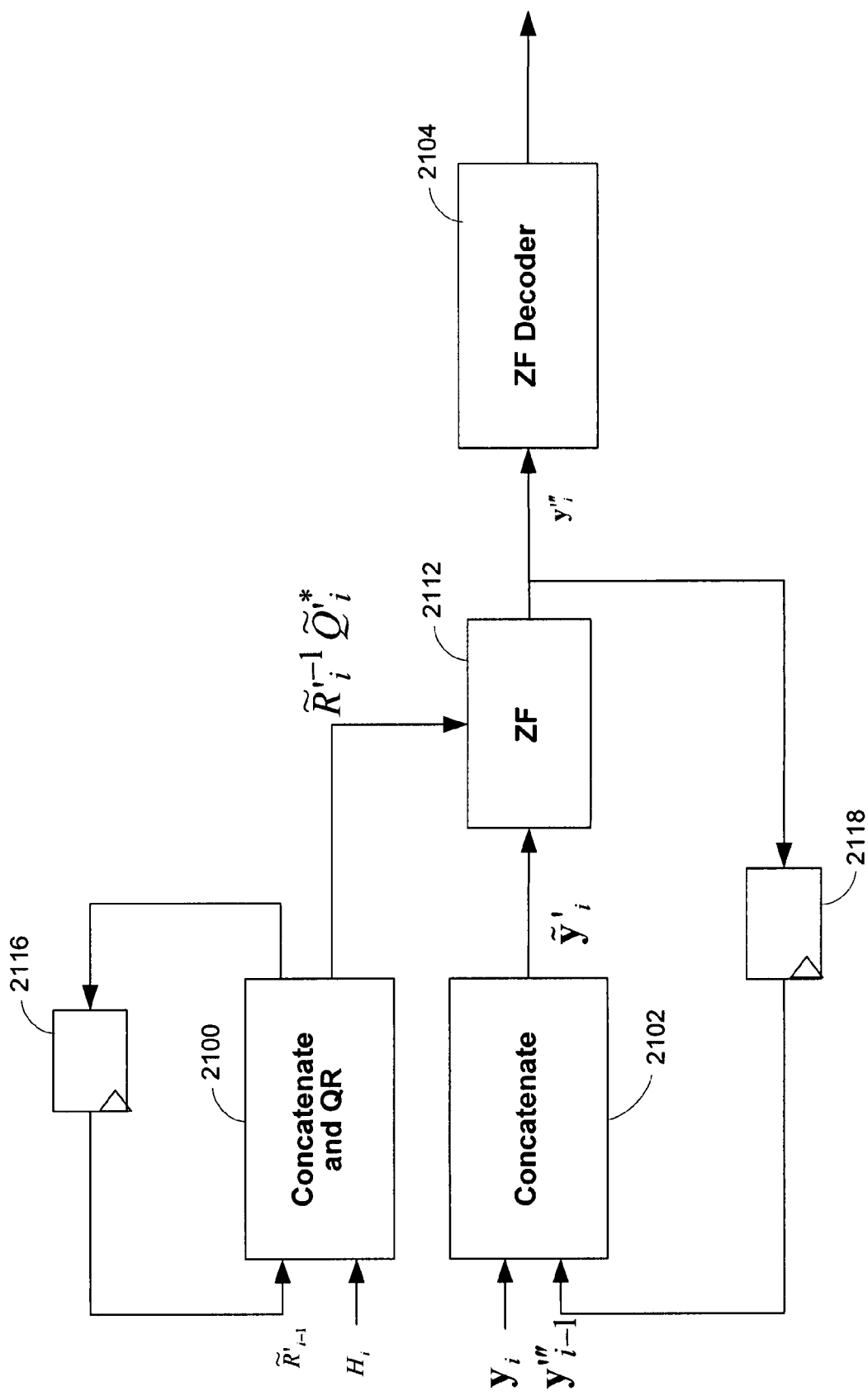

FIG. 21 shows a receiver configuration in accordance with another embodiment of the present invention. In particular, FIG. 21 shows a receiver configuration that uses a linear equalizer to equalize a combined signal vector, and a linear decoder that decodes the equalized combined signal vector using a linear decoding metric. Note that this block diagram has a similar structure to the block diagram shown in FIG. 15. FIG. 21 is shown to use zero-forcing (ZF) equalization and decoding. However, any other suitable linear equalizer and decoder, such as a minimum mean squared error (MMSE) equalizer, may be contemplated. In the block diagram of FIG. 21, combiners 2100 and 2102 may operate in a similar way as combiners 2000 and 2002 of FIG. 20, respectively. That is, channel combiner/preprocessor 2100 may combine and pre-process a previously computed $\tilde{R}'_{i-1}$ matrix with a current channel response matrix. Combiner 2102 may combine a previously computed processed signal vector, $y'''_{i-1}$, with a current received signal vector. Storage systems 2116 and 2118 can also be used similarly, and therefore sized similarly, to storage systems 2016 and 2018 of FIG. 20. Therefore, the receiver configuration of FIG. 21 may have any or all of the complexity reduction benefits described above in connection with FIG. 20.

The receiver configuration of FIG. 21 may have substantially equal decoding performance to the zero-forcing decoding scheme described above in connection with FIG. 15. In particular, the ZF equalizer 2112 and ZF decoder 2104 may produce equivalent information as the information produced by ZF equalizer 1512 and ZF decoder 1504 (FIG. 15). Using information from combiners 2100 and 2102, ZF equalizer 2112 may equalize the combined signal vector by multiplying the combined signal vector by $\tilde{H}'^{-1}_i = R'^{-1}_i Q'^*_i$.

This yields, $$y'''_i = \tilde{R}'^{-1}_i \tilde{Q}'^*_i \begin{bmatrix} y''_{i-1} \\ y_i \end{bmatrix} \quad (52)$$

$$= \tilde{R}'^{-1}_i \tilde{Q}'^*_i \begin{bmatrix} \tilde{Q}_{i-1} & 0 \\ 0 & I \end{bmatrix}^* \begin{bmatrix} y_{i-1} \\ y_i \end{bmatrix} \quad (53)$$

$$= \tilde{R}^{-1}_i \tilde{Q}^*_i \begin{bmatrix} y_{i-1} \\ y_i \end{bmatrix} \quad (54)$$

$$= y''_i \quad (55)$$

at the output of ZF equalizer 2112. Thus, FIGS. 15 and 21 have equivalent performance up through at least equalization step. Following equalization of a combined signal vector, ZF decoder 2104 may calculate a decoding metric, $$\frac{\left| \left[ \tilde{R}'^{-1} \tilde{Q}'^* y' \right]_k - [\hat{x}]_k \right|^2}{\left[ \tilde{R}'^{-1} \tilde{R}'^{-*} \right]_{k,k}}, \quad (56)$$

for each valid signal vector, $\hat{x}$. The decoding metric for ZF decoder 1504 is reproduced here as equation (57):

$$\frac{\left| \left[ \tilde{R}^{-1} \tilde{Q}^* \tilde{y} \right]_k - [x]_k \right|^2}{\left[ \tilde{R}^{-1} \tilde{R}^{-*} \right]_{k,k}} \quad (57)$$

The decoding metrics of equations (56) and (57) are equivalent at least because their denominators and numerators are equal. First, the numerators are equal, because the processed signal vectors are equal, as derived above in equations (52) through (55). Second, the denominators are equal, because $\tilde{R}'=\tilde{R}$, as described above in connection with equations (46) and (47). Thus, the block diagram of FIG. 21 greatly lowers the complexity and storage requirement of FIG. 15 without degrading its decoding performance.

It should be understood that the particular channel preprocessing techniques described in connection with FIGS. 20 and 21 are merely illustrative. Channel preprocessors 2000 and 2100 may perform any suitable processing (e.g., calculating an inverse, etc.) on a channel response matrix, and may use any of the resulting information in a later matrix concatenation. Similarly, signal processor 2012 may perform any suitable processing technique, and may use any of the resulting information in a later signal vector concatenation.

Figure 22:
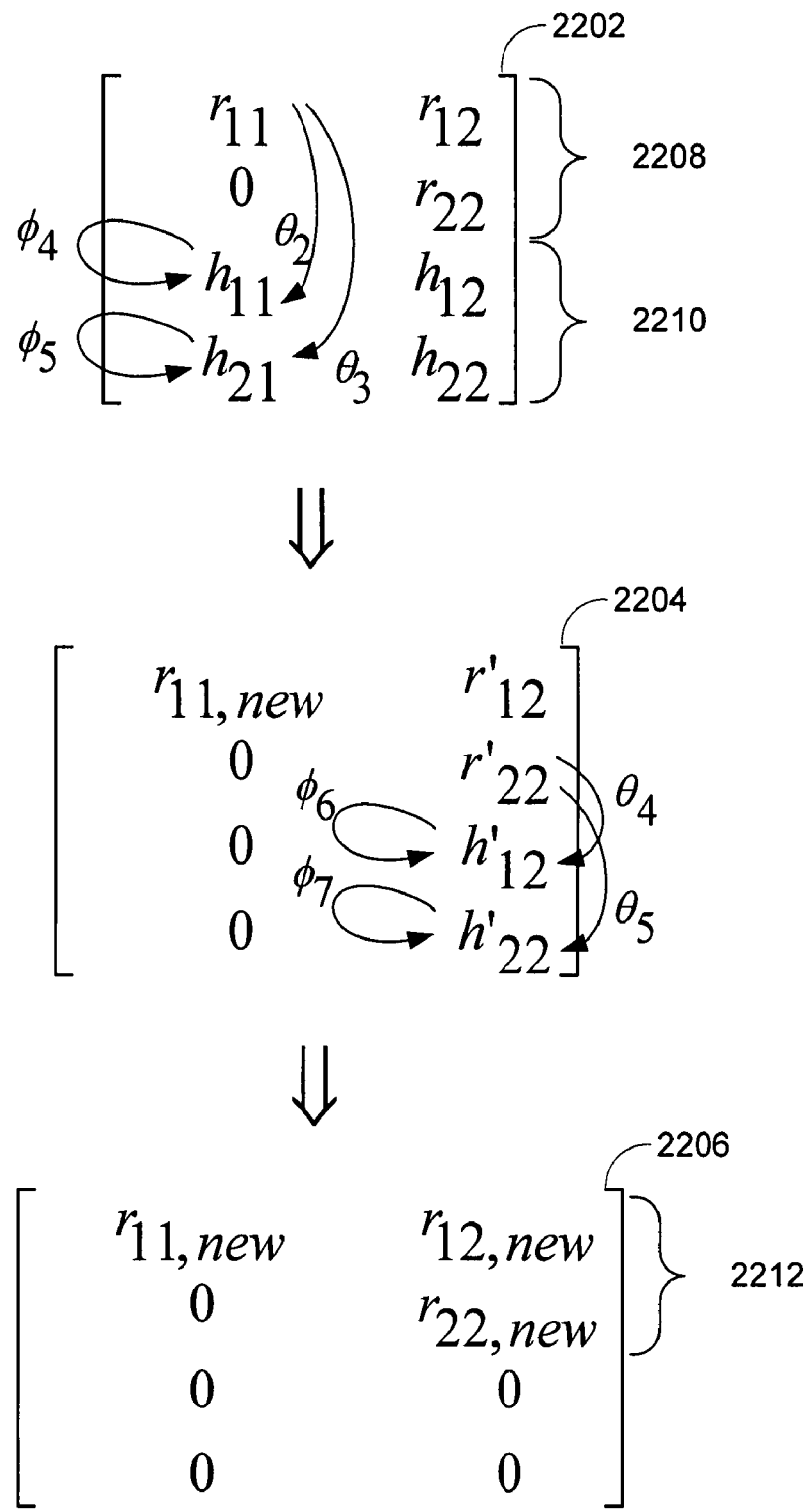
FIGS. 22-23 illustrate QR decompositions of combined channel matrices.

In some embodiments of FIGS. 20 and 21, channel preprocessors 2000 and 2100 may decompose a combined channel matrix using Given's rotations. FIG. 22 shows an example of a QR decomposition of a combined channel matrix for a 2×2 MIMO system. Matrix 2202 of FIG. 22 can represent a 4×2 combined channel matrix when i>1 received signal vectors have been received. Components 2208 of matrix 2202 may be the real components obtained from a previously computed and stored $\tilde{R}'_{i-1}$ matrix. Components 2210 may be the complex components of a channel response matrix associated with the ith received signal vector. A channel preprocessor may first operate on the left column of the combined channel response matrix. The channel preprocessor may rotate the complex components in the left column by angles $\phi_4$ and $\phi_5$.

The resulting real values then lie on a real plane with component $r_{11}$. Thus, they may be treated as vectors $(r_{11}, h'_{11})$ and $(r_{11}, h_{21})$, respectively, and rotated by angles $\theta_2$ and $\theta_3$ onto the y-axis. Following the $\phi_4, \phi_5, \theta_2$ and $\theta_3$ rotations, matrix 2202 may be decomposed into matrix 2204. In particular, $r_{11}$ of matrix 2202 may be rotated by $\theta_2$ and $\theta_3$, and therefore may equal a new value, $r_{11,new}$, shown in matrix 2204. In rotating $r_{11}$, the values in each of the right columns of matrix 2202 are also rotated. The new values following the rotations are indicated in the right column of matrix 2204.

Following the first four Given's rotations shown in FIG. 22, the left column of the resulting matrix, matrix 2204, is triangularized. The right column of matrix 2204 may then be operated on to obtain a fully triangularized matrix. A channel preprocessor (e.g., channel preprocessor 2000 or 2100 of FIGS. 20 and 21) may perform a series of Given's rotations on the right column of matrix 2204 to triangularize the matrix. Similar to the left column, the right column of matrix 2204 may be decomposed using four rotation angles: $\phi_6, \phi_7, \theta_4$, and $\theta_5$. These four rotations angles produce real upper triangular matrix 2206. As expected, all of the non-zero values are located in a $N_r \times N_t$, or 2×2, submatrix of matrix 2206. Thus, components 2212 of this submatrix can represent the $\tilde{R}'_i$ matrix, and may be stored and used in a future combined channel matrix. The rotation matrix necessary for converting matrix 2202 to matrix 2206 is given by, $\tilde{Q}^*_i \Leftarrow \{\phi_4, \phi_5, \theta_2, \theta_3, \phi_6, \phi_7, \theta_4, \theta_5\}$. Thus, $\tilde{Q}^*_i$ represents the conjugate transpose of the $\tilde{Q}^*_i$ matrix in the QR decomposition of matrix 2202.

When another signal vector is received, components 2212 of real upper triangular matrix 2206 may serve as components 2208 in the next QR decomposition. The new channel response matrix associated with the newly received signal vector would then serve as components 2210. Thus, a combined channel matrix of the format of matrix 2202 may be reconstructed whenever a new signal vector is received. Accordingly, a channel preprocessor (e.g., channel preprocessors 2000 and 2100) can perform the same eight Given's rotations (e.g., $\tilde{Q}^*_2 \Leftarrow \{\phi_4, \phi_5, \theta_2, \theta_3, \phi_6, \phi_7, \theta_4, \theta_5\}$) even though the number of received signal vectors has increased, and can perform these eight rotations each time a new signal vector is received. Thus, the channel preprocessor may operate independently of the total number of received signal vectors.

To further illustrate the advantages of including $\tilde{R}$ matrices in combined channel matrices, an example of a 2×2 MIMO system with three received signal vectors will be described herein with reference to FIG. 23. FIG. 23 shows combined channel matrix 2300 that is a matrix concatenation of channel response matrices associated with the three received signal vectors—$H_1, H_2$, and $H_3$, or $\tilde{H}_3$. Thus, FIG. 23 may be used to illustrate the disadvantages of concatenating only unprocessed channel response matrices, as illustrated in FIGS. 14 and 15, as well as the advantages of including processed $\tilde{R}$ matrices, as illustrated in FIGS. 20 and 21. FIG. 23 shows the Given's rotations necessary for fully decomposing combined channel matrix 2300. Thus, combined channel matrix 2300 may be decomposed using 20 rotations, or with a rotation matrix given by $\tilde{Q}^*_3 \Leftarrow \{\phi_1, \phi_2, \theta_1, \phi_3, \phi_4, \phi_5, \theta_2, \theta_3, \phi_6, \phi_7, \theta_4, \theta_5, \phi_8, \phi_9, \theta_6, \theta_7, \phi_{10}, \phi_{11}, \theta_8, \theta_9\}$. If the signal vectors are received serially or are processed serially, a channel preprocessor may obtain and preprocess three separate combined channel matrices, $\tilde{H}_1$ including only $H_1$, $\tilde{H}_2$ including both $H_1$ and $H_2$, and $\tilde{H}_3$ including all three matrices. These combined channel matrices could be decomposed using the following rotation matrices:

| | |
|---|---|
| 1 | $\tilde{Q}_1^* \Leftarrow \{\phi_1, \phi_2, \theta_1, \phi_3\}$ |
| 2 | $\tilde{Q}_2^* \Leftarrow \{\phi_1, \phi_2, \theta_1, \phi_3, \phi_4, \phi_5, \theta_2, \theta_3, \phi_6, \phi_7\}$ |
| 3 | $\tilde{Q}_3^* \Leftarrow \{\phi_1, \phi_2, \theta_1, \phi_3, \phi_4, \phi_5, \theta_2, \theta_3, \phi_6, \phi_7, \theta_4, \theta_5, \phi_8, \phi_9, \theta_6, \theta_7, \phi_{10}, \phi_{11}, \theta_8, \theta_9\}$ |

The first set of rotations are repeated in the second computation, and all of the rotations in the second computation are repeated in the third computation. Extending the example to N received signal vectors, the first four rotations would be performed N times, the new rotations in the second set would be computed (N−1) times, and the new rotations in the third set would be computed (N−2) times. Clearly, the number of computations, and therefore the amount of hardware or time to completion, would grow as more signal vectors are received. Thus, to allow for a scalable architecture, it would be beneficial to reuse previously computed information so that these rotations do not need to be repeatedly performed.

If a receiver architecture is provided that does not recompute previously obtained information, the rotations illustrated in FIG. 23 may be split between the first three computations. For example, the receiver configuration of FIGS. 20 and 21 allows for complete reuse of previously computed information. Then, the 20 rotations are effectively divided as follows:

| | |
|---|---|
| 1 | $\tilde{Q}'^*_1 \Leftarrow \{\phi_1, \phi_2, \theta_1, \phi_3\}$ |
| 2 | $\tilde{Q}'^*_2 \Leftarrow \{\phi_4, \phi_5, \theta_2, \theta_3, \phi_6, \phi_7, \theta_4, \theta_5\}$ |
| 3 | $\tilde{Q}'^*_3 \Leftarrow \{\phi_8, \phi_9, \theta_6, \theta_7, \phi_{10}, \phi_{11}, \theta_8, \theta_9\}$ |

Thus, and as shown in the example in FIG. 22, each decomposition uses no more than eight Given's rotations.

Furthermore, using the receiver structure of FIGS. 20 and 21, $\tilde{Q}'^*_3$ may be implemented using the same structure (e.g., circuitry, software, etc.) as $\tilde{Q}'^*_2$. This can also be illustrated by the Givens rotations of FIG. 23, as follows. After the first four rotations, which may be performed after the first signal vector is received, matrix 2300 is converted to, $$\tilde{H}'_2 = \begin{bmatrix} r_{11} & r_{11} \\ 0 & r_{11} \\ h_{11,2} & h_{12,2} \\ h_{21,2} & h_{22,2} \\ h_{11,3} & h_{12,3} \\ h_{21,3} & h_{22,3} \end{bmatrix} \equiv \begin{bmatrix} \tilde{R}_1 \\ H_2 \\ H_3 \end{bmatrix}. \tag{58}$$

The second computation, performed after a second signal vector is received, operates on the middle 2×2 submatrix of equation (58). Thus, equation (58) may effectively be, $$\tilde{H}'_2 = \begin{bmatrix} r_{11} & r_{12} \\ 0 & r_{22} \\ h_{11,2} & h_{12,2} \\ h_{21,2} & h_{22,2} \end{bmatrix} \equiv \begin{bmatrix} \tilde{R}_1 \\ H_2 \end{bmatrix}. \tag{59}$$

The matrix of equation (59) may then be converted into an upper triangular matrix using the eight rotations represented by matrix $\tilde{Q}'^*_2$. This conversion may be written as, $$\tilde{Q}_2'^* \begin{bmatrix} \tilde{R}_1 \\ H_2 \end{bmatrix} = \begin{bmatrix} \tilde{R}_2 \\ 0 \end{bmatrix}. \quad (60)$$

Thus, $\tilde{Q}'^*_2$ can be used to decompose a matrix concatenation of a 2×2 upper triangular matrix and an unprocessed 2×2 channel response matrix. At this point, the full matrix takes the form, $$\tilde{H}'_3 = \begin{bmatrix} r_{11} & r_{12} \\ 0 & r_{22} \\ 0 & 0 \\ 0 & 0 \\ h_{11,3} & h_{12,3} \\ h_{21,3} & h_{22,3} \end{bmatrix} = \begin{bmatrix} \tilde{R}_2 \\ 0 \\ 0 \\ H_3 \end{bmatrix}. \quad (61)$$

The matrix of equation (61) may then be converted into an upper triangular matrix using the final eight rotations represented by matrix $\tilde{Q}'^*_3$. The conversion may be represented as, $$\tilde{Q}_3'^* \begin{bmatrix} \tilde{R}_2 \\ 0 \\ 0 \\ H_3 \end{bmatrix} = \begin{bmatrix} \tilde{R}_3 \\ 0 \\ 0 \\ 0 \end{bmatrix}. \quad (62)$$

Note that the zero matrices of equation (62) do not add anything to the computation. Thus, the zero matrices may be removed without affecting the result of the equation. This is essentially what the receiver configurations of FIGS. 20 and 21 accomplish by concatenating only the $\tilde{R}'_{i-1}$ matrix with a current channel response matrix. Accordingly, equation (62) may equivalently be written as, $$\tilde{Q}_2'^* \begin{bmatrix} \tilde{R}_2 \\ H_3 \end{bmatrix} \begin{bmatrix} \tilde{R}_3 \\ 0 \end{bmatrix}, \quad (63)$$

where $\tilde{Q}'^*_2$ represents the eight rotations, or $\tilde{Q}'^*_2 \Leftarrow \{\phi_4, \phi_5, \theta_2, \theta_3, \phi_6, \phi_7, \theta_4, \theta_5\}$, necessary for decomposing a matrix concatenation of an upper triangular matrix, $R_2$, and an unprocessed channel matrix, $H_3$. Therefore, $\tilde{Q}'^*_3$, shown in equation (62), may perform the same operations as $\tilde{Q}'^*_2$, shown in equation (63). In fact, any $\tilde{Q}'^*_i$ for i>1 may perform the same operations as $\tilde{Q}'^*_2$. Therefore, the present invention provides a receiver that is scalable for any number of received signal vectors.

It should be understood that the 20 rotations of FIG. 23 could be arranged in any suitable way among the first three computations. In some embodiments, only a subset of the rotations are stored and reused, while other rotations are repeatedly computed. For example, in some embodiments of the present invention, the first four rotations associated with decomposing $\tilde{H}_1$ may be reused in successive decompositions, while the results of any remaining rotations are not stored. A receiver that implements this strategy may use the following rotation matrices:

| 1 | $\tilde{Q}_1^* \Leftarrow \{\phi_1, \phi_2, \theta_1, \phi_3\}$ |
| 2 | $\tilde{Q}_2^* \Leftarrow \{\phi_4, \phi_5, \theta_2, \theta_3, \phi_6, \phi_7\}$ |

-continued

| 3 | $\tilde{Q}_3^* \Leftarrow \{\phi_4, \phi_5, \theta_2, \theta_3, \phi_6, \phi_7, \theta_4, \theta_5, \phi_8, \phi_9, \theta_6, \theta_7, \phi_{10}, \phi_{11}, \theta_8, \theta_9\}$ |

Notice that each of the rotations in the second time interval are recomputed in the third interval. To implement this strategy, a preprocessor (e.g., preprocessor 2000 or 2100 in FIGS. 20 and 21) may create a combined channel matrix according to, $$\tilde{H}_i = [\tilde{R}_1^T H_2^T \ldots H_i^T]^T. \quad (64)$$

Alternatively, to reuse only computations from the first two decompositions, the preprocessor could create a combined channel matrix according to, $$\tilde{H}_i = [\tilde{R}_2^T H_3^T \ldots H_i^T]^T. \quad (65)$$

Thus, any technique for creating a combined channel matrix that includes previously computed $\tilde{R}$ matrices falls within the scope of the present invention.

Referring now to FIGS. 24A-24G, various exemplary implementations of the present invention are shown.

Figure 24A:
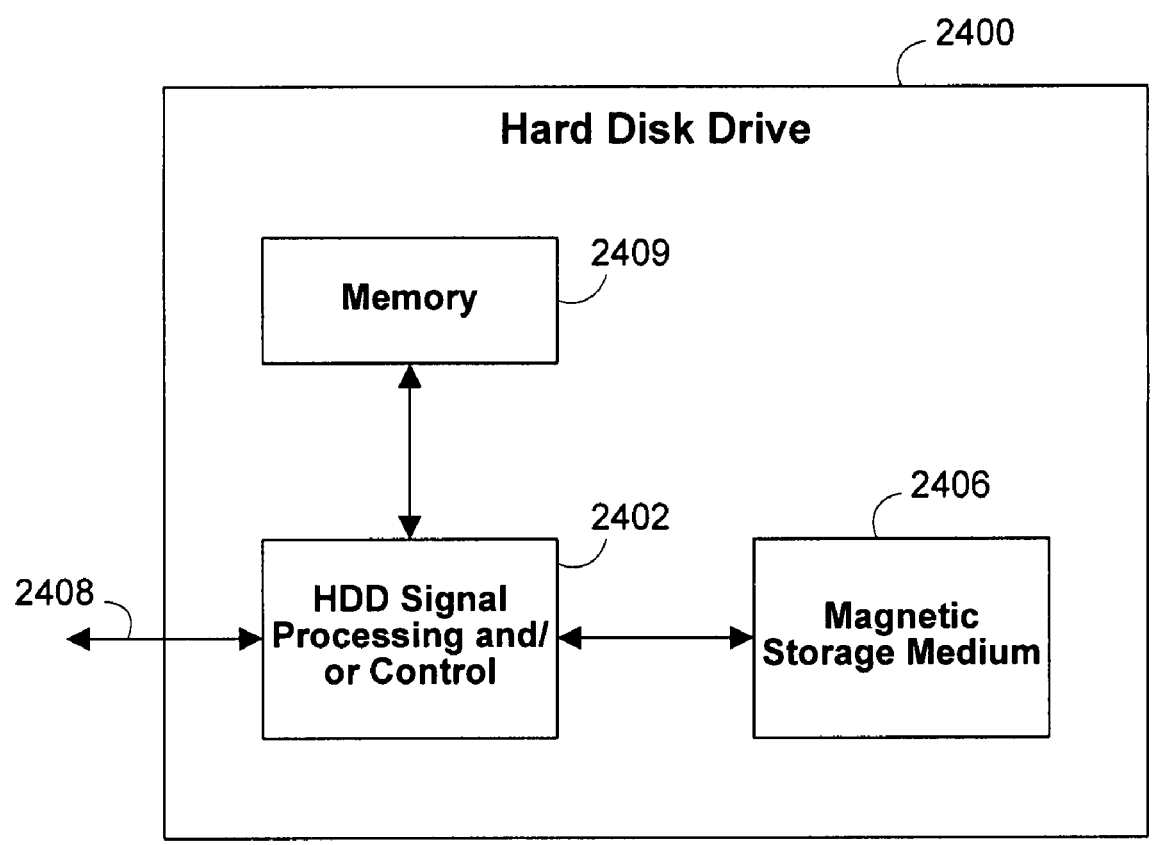
FIG. 24A is a block diagram of an exemplary hard disk drive that can employ the disclosed technology.

Referring now to FIG. 24A, the present invention can be implemented in a hard disk drive 2400. The present invention may implement either or both signal processing and/or control circuits, which are generally identified in FIG. 24A at 2402. In some implementations, the signal processing and/or control circuit 2402 and/or other circuits (not shown) in the HDD 2400 may process data, perform coding and/or encryption, perform calculations, and/or format data that is output to and/or received from a magnetic storage medium 2406.

The HDD 2400 may communicate with a host device (not shown) such as a computer, mobile computing devices such as personal digital assistants, cellular phones, media or MP3 players and the like, and/or other devices via one or more wired or wireless communication links 2408. The HDD 2400 may be connected to memory 2409 such as random access memory (RAM), low latency nonvolatile memory such as flash memory, read only memory (ROM) and/or other suitable electronic data storage.

Figure 24B:
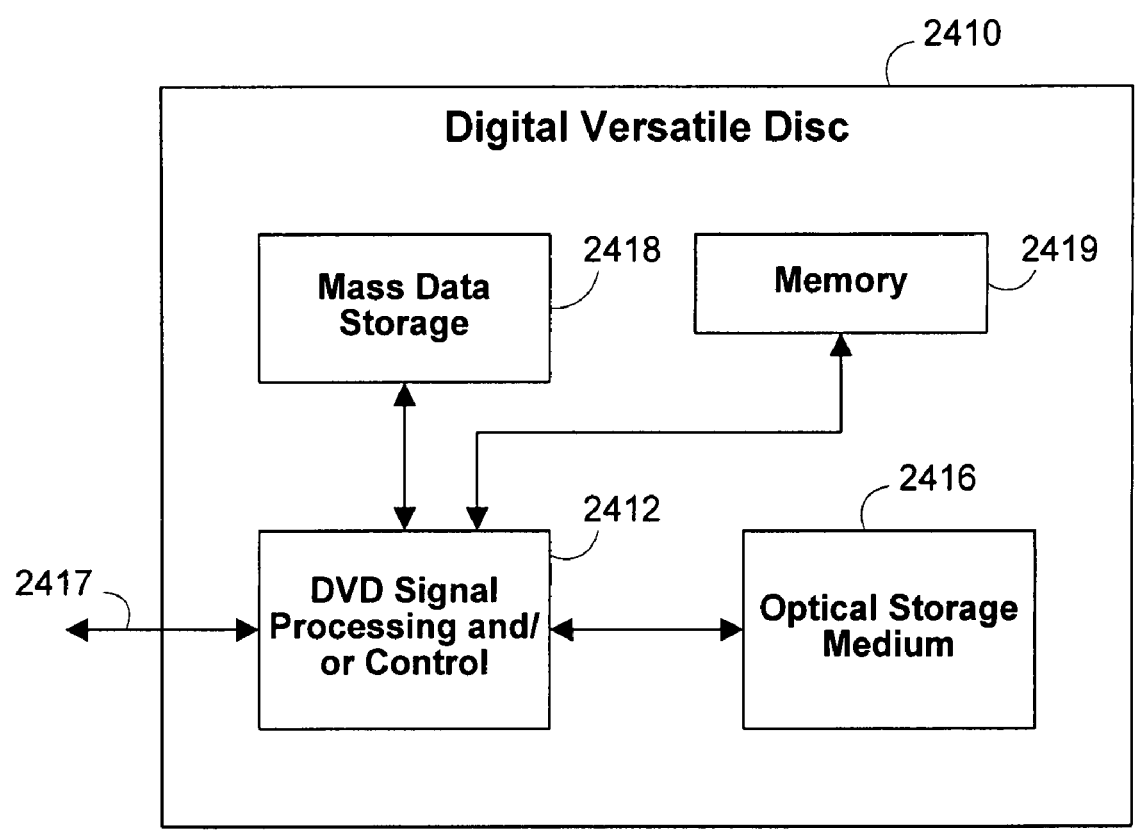
FIG. 24B is a block diagram of an exemplary digital versatile disc that can employ the disclosed technology.

Referring now to FIG. 24B, the present invention can be implemented in a digital versatile disc (DVD) drive 2410. The present invention may implement either or both signal processing and/or control circuits, which are generally identified in FIG. 24B at 2412, and/or mass data storage of the DVD drive 2410. The signal processing and/or control circuit 2412 and/or other circuits (not shown) in the DVD 2410 may process data, perform coding and/or encryption, perform calculations, and/or format data that is read from and/or data written to an optical storage medium 2416. In some implementations, the signal processing and/or control circuit 2412 and/or other circuits (not shown) in the DVD 2410 can also perform other functions such as encoding and/or decoding and/or any other signal processing functions associated with a DVD drive.

The DVD drive 2410 may communicate with an output device (not shown) such as a computer, television or other device via one or more wired or wireless communication links 2417. The DVD 2410 may communicate with mass data storage 2418 that stores data in a nonvolatile manner. The mass data storage 2418 may include a hard disk drive (HDD). The HDD may have the configuration shown in FIG. 24A. The HDD may be a mini HDD that includes one or more platters having a diameter that is smaller than approximately 1.8" The DVD 2410 may be connected to memory 2419 such as RAM, ROM, low latency nonvolatile memory such as flash memory and/or other suitable electronic data storage.

Figure 24C:
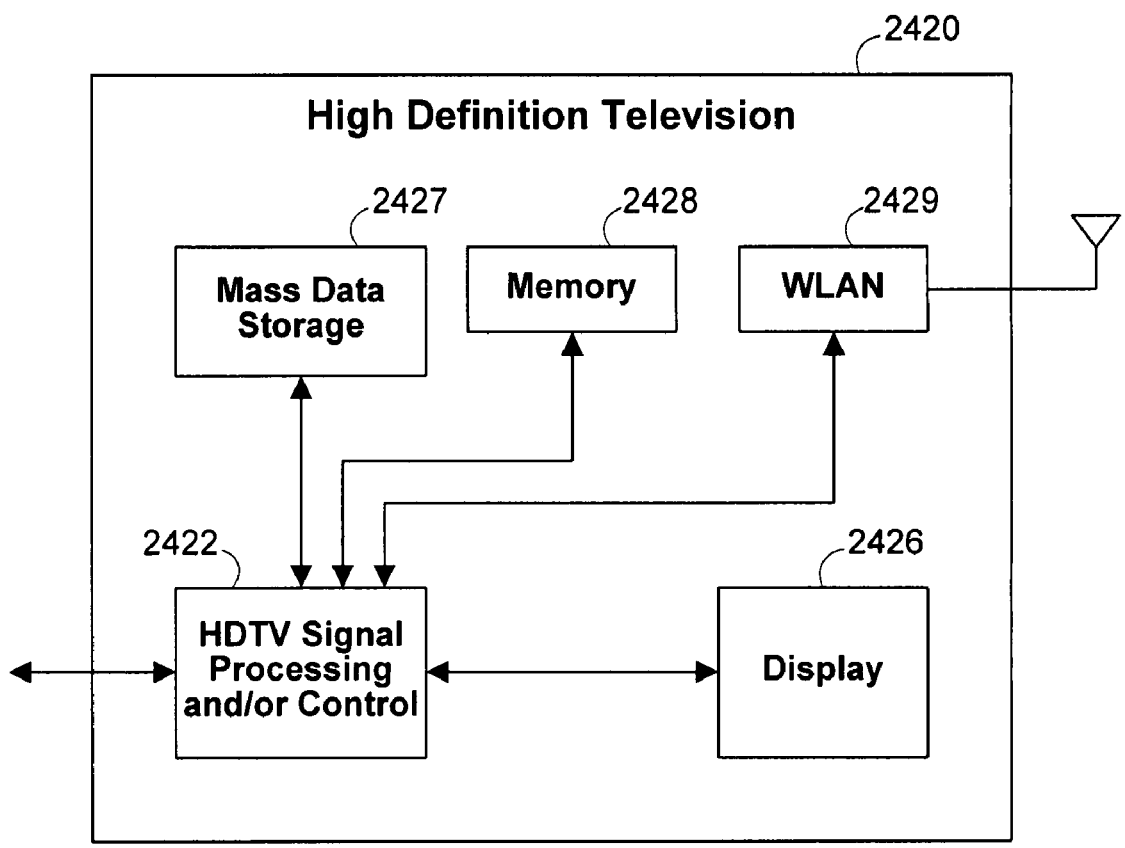
FIG. 24C is a block diagram of an exemplary high definition television that can employ the disclosed technology.

Referring now to FIG. 24C, the present invention can be implemented in a high definition television (HDTV) 2420. The present invention may implement either or both signal processing and/or control circuits, which are generally identified in FIG. 24C at 2422, a WLAN interface and/or mass data storage of the HDTV 2420. The HDTV 2420 receives HDTV input signals in either a wired or wireless format and generates HDTV output signals for a display 2426. In some implementations, signal processing circuit and/or control circuit 2422 and/or other circuits (not shown) of the HDTV 2420 may process data, perform coding and/or encryption, perform calculations, format data and/or perform any other type of HDTV processing that may be required.

The HDTV 2420 may communicate with mass data storage 2427 that stores data in a nonvolatile manner such as optical and/or magnetic storage devices for example hard disk drives HDD and/or DVDs. At least one HDD may have the configuration shown in FIG. 24A and/or at least one DVD may have the configuration shown in FIG. 24B. The HDD may be a mini HDD that includes one or more platters having a diameter that is smaller than approximately 1.8"The HDTV 2420 may be connected to memory 2428 such as RAM, ROM, low latency nonvolatile memory such as flash memory and/or other suitable electronic data storage. The HDTV 2420 also may support connections with a WLAN via a WLAN network interface 2429.

Figure 24D:
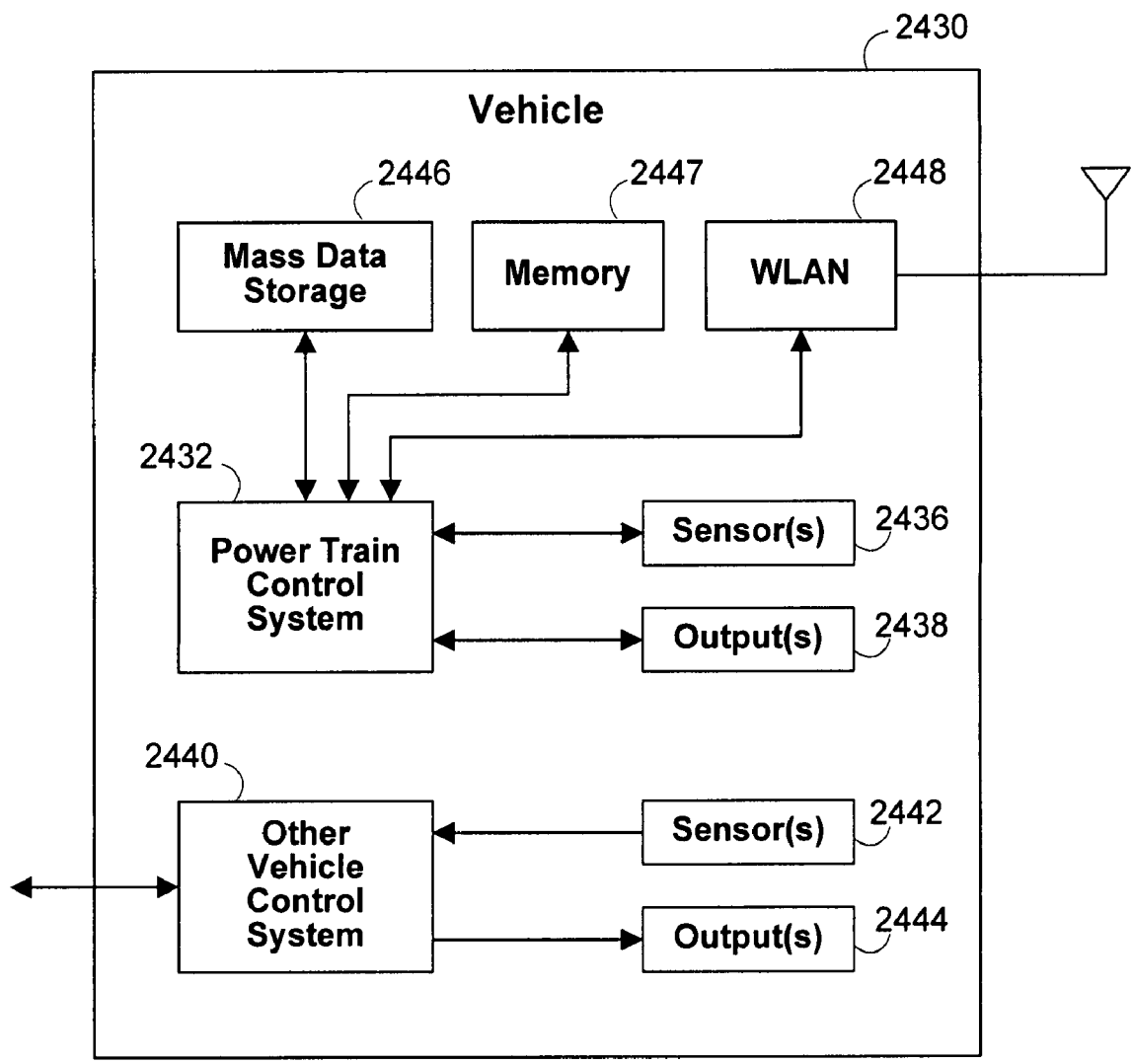
FIG. 24D is a block diagram of an exemplary vehicle that can employ the disclosed technology.

Referring now to FIG. 24D, the present invention implements a control system of a vehicle 2430, a WLAN interface and/or mass data storage of the vehicle control system. In some implementations, the present invention may implement a powertrain control system 2432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 2440 of the vehicle 2430. The control system 2440 may likewise receive signals from input sensors 2442 and/or output control signals to one or more output devices 2444. In some implementations, the control system 2440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 2432 may communicate with mass data storage 2446 that stores data in a nonvolatile manner. The mass data storage 1046 may include optical and/or magnetic storage devices for example hard disk drives HDD and/or DVDs. At least one HDD may have the configuration shown in FIG. 24A and/or at least one DVD may have the configuration shown in FIG. 24B. The HDD may be a mini HDD that includes one or more platters having a diameter that is smaller than approximately 1.8"The powertrain control system 2432 may be connected to memory 2447 such as RAM, ROM, low latency nonvolatile memory such as flash memory and/or other suitable electronic data storage. The powertrain control system 2432 also may support connections with a WLAN via a WLAN network interface 2448. The control system 2440 may also include mass data storage, memory and/or a WLAN interface (all not shown).

Figure 24E:
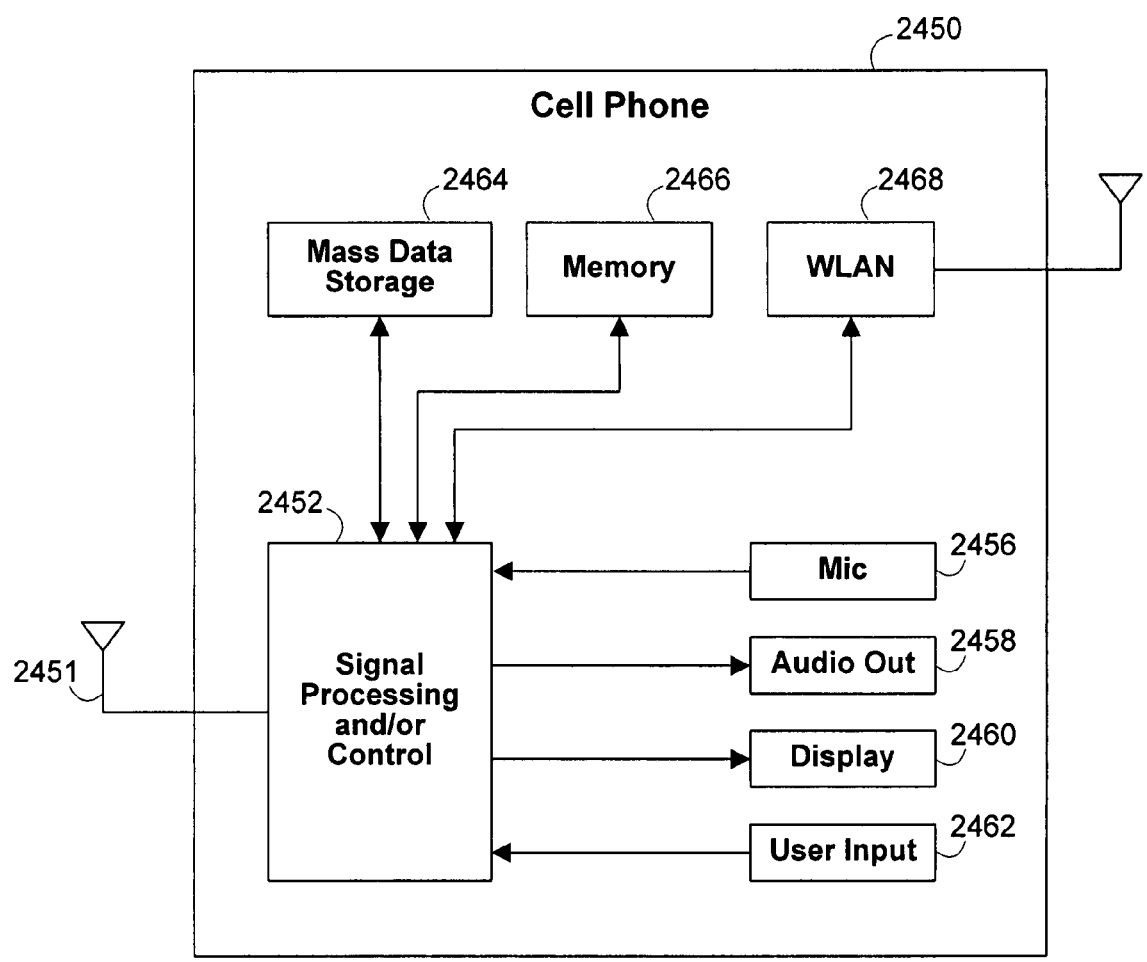
FIG. 24E is a block diagram of an exemplary cell phone that can employ the disclosed technology.

Referring now to FIG. 24E, the present invention can be implemented in a cellular phone 2450 that may include a cellular antenna 2451. The present invention may implement either or both signal processing and/or control circuits, which are generally identified in FIG. 24E at 2452, a WLAN interface and/or mass data storage of the cellular phone 2450. In some implementations, the cellular phone 2450 includes a microphone 2456, an audio output 2458 such as a speaker and/or audio output jack, a display 2460 and/or an input device 2462 such as a keypad, pointing device, voice actuation and/or other input device. The signal processing and/or control circuits 2452 and/or other circuits (not shown) in the cellular phone 2450 may process data, perform coding and/or encryption, perform calculations, format data and/or perform other cellular phone functions.

The cellular phone 2450 may communicate with mass data storage 2464 that stores data in a nonvolatile manner such as optical and/or magnetic storage devices for example hard disk drives HDD and/or DVDs. At least one HDD may have the configuration shown in FIG. 24A and/or at least one DVD may have the configuration shown in FIG. 24B. The HDD may be a mini HDD that includes one or more platters having a diameter that is smaller than approximately 1.8"The cellular phone 2450 may be connected to memory 2466 such as RAM, ROM, low latency nonvolatile memory such as flash memory and/or other suitable electronic data storage. The cellular phone 2450 also may support connections with a WLAN via a WLAN network interface 2468.

Figure 24F:
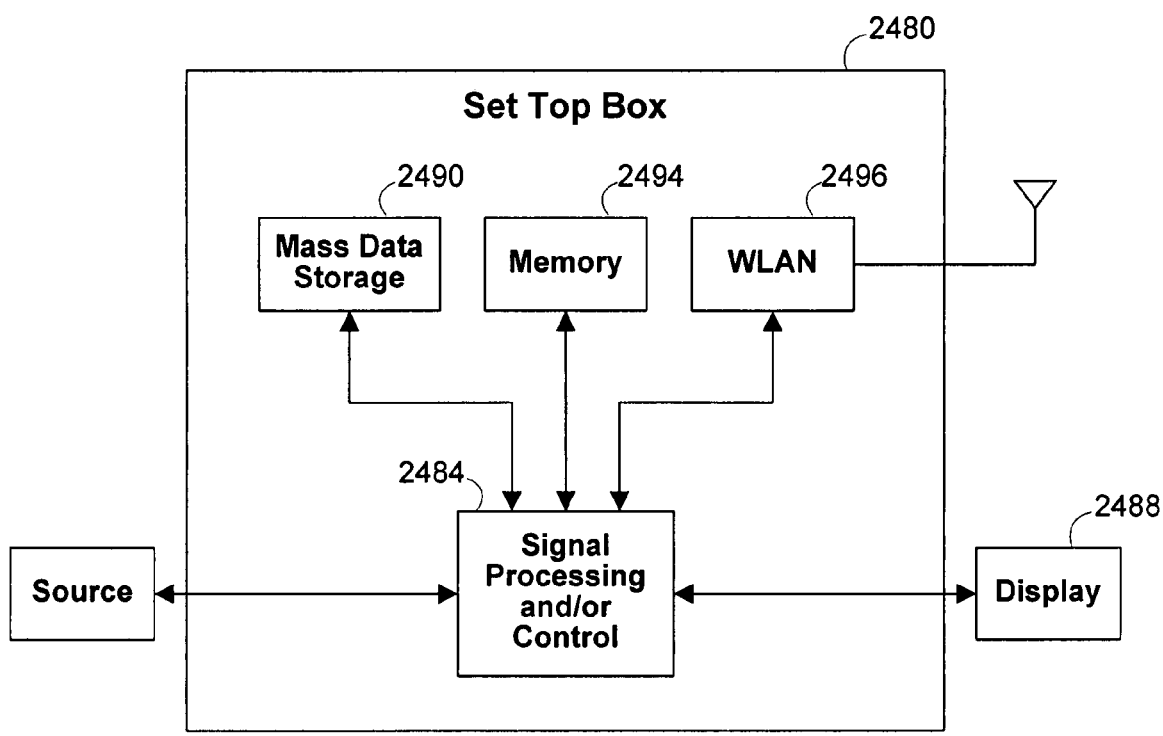
FIG. 24F is a block diagram of an exemplary set top box that can employ the disclosed technology.

Referring now to FIG. 24F, the present invention can be implemented in a set top box 2480. The present invention may implement either or both signal processing and/or control circuits, which are generally identified in FIG. 24F at 2484, a WLAN interface and/or mass data storage of the set top box 2480. The set top box 2480 receives signals from a source such as a broadband source and outputs standard and/or high definition audio/video signals suitable for a display 2488 such as a television and/or monitor and/or other video and/or audio output devices. The signal processing and/or control circuits 2484 and/or other circuits (not shown) of the set top box 2480 may process data, perform coding and/or encryption, perform calculations, format data and/or perform any other set top box function.

The set top box 2480 may communicate with mass data storage 2490 that stores data in a nonvolatile manner. The mass data storage 2490 may include optical and/or magnetic storage devices for example hard disk drives HDD and/or DVDs. At least one HDD may have the configuration shown in FIG. 24A and/or at least one DVD may have the configuration shown in FIG. 24B. The HDD may be a mini HDD that includes one or more platters having a diameter that is smaller than approximately 1.8"The set top box 2480 may be connected to memory 2494 such as RAM, ROM, low latency nonvolatile memory such as flash memory and/or other suitable electronic data storage. The set top box 2480 also may support connections with a WLAN via a WLAN network interface 2496.

Figure 24G:
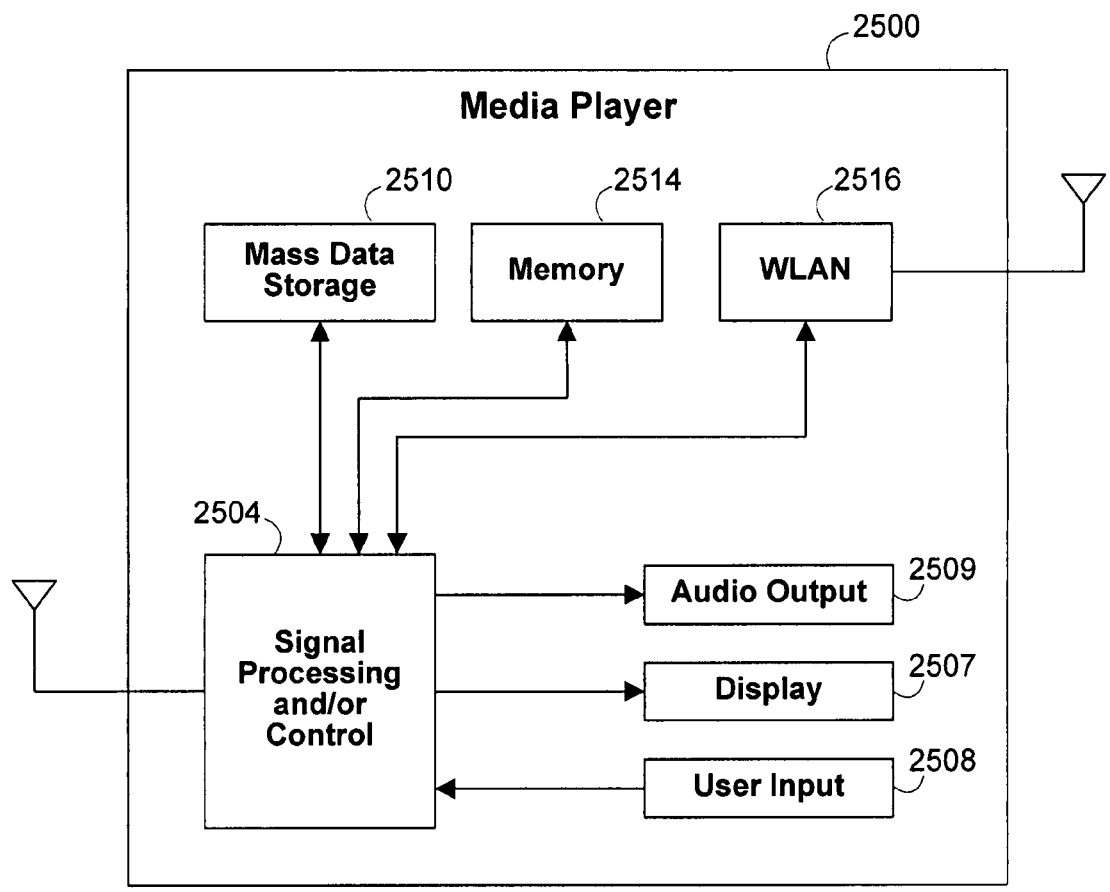
FIG. 24G is a block diagram of an exemplary media player that can employ the disclosed technology.

Referring now to FIG. 24G, the present invention can be implemented in a media player 2560. The present invention may implement either or both signal processing and/or control circuits, which are generally identified in FIG. 24G at 2504, a WLAN interface and/or mass data storage of the media player 2500. In some implementations, the media player 2500 includes a display 2507 and/or a user input 2508 such as a keypad, touchpad and the like. In some implementations, the media player 2500 may employ a graphical user interface (GUI) that typically employs menus, drop down menus, icons and/or a point-and-click interface via the display 2507 and/or user input 2508. The media player 2500 further includes an audio output 2509 such as a speaker and/or audio output jack. The signal processing and/or control circuits 2504 and/or other circuits (not shown) of the media player 2500 may process data, perform coding and/or encryption, perform calculations, format data and/or perform any other media player function.

The media player 2500 may communicate with mass data storage 2510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 24A and/or at least one DVD may have the configuration shown in FIG. 24B. The HDD may be a mini HDD that includes one or more platters having a diameter that is smaller than approximately 1.8"The media player 2500 may be connected to memory 2514 such as RAM, ROM, low latency nonvolatile memory such as flash memory and/or other suitable electronic data storage. The media player 2500 also may support connections with a WLAN via a WLAN network interface 2516. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method of decoding a signal vector in a multiple-input multiple-output transmission scheme, comprising:
   receiving a first and a second signal vectors corresponding to a common transmit signal vector;
   preprocessing a first channel response matrix associates with the first signal vector;
   processing the first signal vector using the preprocessed first channel response matrix;
   concatenating the processed first signal vector and the second signal vector to form a combined signal vector;
   processing the combined signal vector; and
   decoding, using decoding circuitry, the processed combined signal vector.

2. The method of claim 1 wherein the first and second signal vectors are received using a retransmission protocol.

3. The method of claim 2 wherein the retransmission protocol is a hybrid automatic repeat request (HARQ) protocol.

4. The method of claim 1 wherein the first and second signal vectors are received using a scheme with a fixed number of transmissions.

5. The method of claim 4 wherein the fixed-number transmission scheme is repetition coding.

6. The method of claim 1 wherein symbols of the received signal vectors correspond to a signal constellation set.

7. The method of claim 6 wherein the signal constellation set is based on quadrature amplitude modulation.

8. The method of claim 1 wherein the received signal vectors are one of coded and uncoded data.

9. The method of claim 1 wherein concatenating the processed first signal vector and the second signal vector comprises forming a vector, $\tilde{y}'$, wherein $$\tilde{y}'=[y_1''^T y_2^T]^T,$$

$y_1''$ is the processed first signal vector, and $y_2$ is the second signal vector, and T denotes a transpose operation.

10. The method of claim 1, further comprising:
    concatenating the preprocessed first channel response matrix and a second channel response matrix associated with the second signal vector to form a combined channel response matrix; and
    preprocessing the combined channel response matrix, wherein the combined channel response matrix is used to process the combined signal vector.

11. The method of claim 10, wherein concatenating the preprocessed first channel response matrix and the second channel response matrix comprises forming a matrix, $\tilde{H}'$, wherein $$\tilde{H}'=[R_1^T H_2^T]^T,$$

$R_1$ is the preprocessed first channel response matrix, $H_2$ is the second channel response matrix, and T denotes a transpose operation.

12. The method of claim 10 wherein preprocessing the combined channel response matrix comprises decomposing the combined channel response matrix into an upper triangular matrix.

13. The method of claim 12 wherein decomposing the combined channel response matrix comprises performing a series of Given's rotations on the combined channel response matrix.

14. The method of claim 10 wherein processing the combined signal vector comprises multiplying the combined signal vector by an orthogonal matrix, $Q'^*$, obtained from preprocessing the combined channel response matrix.

15. The method of claim 10 wherein processing the combined signal vector comprises one of zero-forcing and minimum mean squared error equalization.

16. The method of claim 10 wherein the processed combined signal vector is decoded using the preprocessed combined channel response matrix.

17. The method of claim 1, further comprising:
    receiving a third signal vector associated with the common transmit signal vector;
    concatenating the processed combined signal vector and the third signal vector to form an updated combined signal vector;
    processing the updated combined signal vector; and
    decoding the processed updated combined signal vector.

18. The method of claim 17, further comprising:
    concatenating a channel matrix and a third channel response matrix associated with the third signal vector to form an updated combined channel response matrix, wherein the channel matrix includes information about channel response matrices associated with the first and second received signal vectors, and wherein the updated combined signal vector is processed using the updated combined channel response matrix.

19. The method of claim 1, further comprising:
    storing the processed first signal vector; and
    storing the processed combined signal vector by overwriting the stored processed first signal vector.

20. A system for decoding a signal vector in a multiple-input multiple-output transmission scheme, comprising:
    means for receiving a first and a second signal vectors corresponding to a common transmit signal vector;
    means for preprocessing a first channel response matrix associated with the first signal vector;
    means for processing the first signal vector using the preprocessed first channel response matrix;

means for concatenating the processed first signal vector and the second signal vector to form a combined signal vector;

means for processing the combined signal vector; and decoding circuitry for decoding the processed combined signal vector.

21. The system of claim 20 wherein the first and second signal vectors are received using a retransmission protocol.

22. The system of claim 21 wherein the retransmission protocol is a hybrid automatic repeat request (HARQ) protocol.

23. The system of claim 20 wherein the first and second signal vectors are received using a scheme with a fixed number of transmissions.

24. The system of claim 23 wherein the fixed-number transmission scheme is repetition coding.

25. The system of claim 20 wherein symbols of the received signal vectors correspond to a signal constellation set.

26. The system of claim 25 wherein the signal constellation set is based on quadrature amplitude modulation.

27. The system of claim 20 wherein the received signal vectors are one of coded and uncoded data.

28. The system of claim 20 wherein the means for concatenating the processed first signal vector and the second signal vector comprise means for forming a vector, $\tilde{y}'$, wherein $$\tilde{y}'=[y_1''^T y_2^T]^T,$$

$y_1''$ is the processed first signal vector, and $y_2$ is the second signal vector, and T denotes a transpose operation.

29. The system of claim 20, further comprising:

means for concatenating the preprocessed first channel response matrix and a second channel response matrix associated with the second signal vector to form a combined channel response matrix; and means for preprocessing the combined channel response matrix, wherein the combined channel response matrix is used to process the combined signal vector.

30. The system of claim 29, wherein the means for concatenating the preprocessed first channel response matrix and the second channel response matrix comprise means for forming a matrix, $\tilde{H}'$, wherein $$\tilde{H}'=[R_1^T H_2^T]^T,$$

$R_1$ is the preprocessed first channel response matrix, $H_2$ is the second channel response matrix, and T denotes a transpose operation.

31. The system of claim 29 wherein the means for preprocessing the combined channel response matrix comprise means for decomposing the combined channel response matrix into an upper triangular matrix.

32. The system of claim 31 wherein the means for decomposing the combined channel response matrix comprise means for performing a series of Given's rotations on the combined channel response matrix.

33. The system of claim 29 wherein the means for processing the combined signal vector comprise means for multiplying the combined signal vector by an orthogonal matrix, $Q'^*$, obtained from the means for preprocessing the combined channel response matrix.

34. The system of claim 29 wherein the means for processing the combined signal vector comprises means for performing one of zero-forcing and minimum mean squared error equalization.

35. The system of claim 29 wherein the processed combined signal vector is decoded using the preprocessed combined channel response matrix.

36. The system of claim 20, further comprising:

means for receiving a third signal vector associated with the common transmit signal vector;

means for concatenating the processed combined signal vector and the third signal vector to form an updated combined signal vector;

means for processing the updated combined signal vector; and means for decoding the processed updated combined signal vector.

37. The system of claim 36, further comprising:

means for concatenating a channel matrix and a third channel response matrix associated with the third received signal vector to form an updated combined channel response matrix, wherein the channel matrix includes information about channel response matrices associated with the first and second received signal vectors, and wherein the updated combined signal vector is processed using the updated combined channel response matrix.

38. The system of claim 20, further comprising:

means for storing the processed first signal vector and for storing the processed combined signal vector by overwriting the stored processed first signal vector.

39. A system for decoding a signal vector in a multiple-input multiple-output transmission scheme, comprising:

a receiver for receiving a first, a second, and a third signal vectors corresponding to a common transmit signal vector;

a first signal processor for processing the first signal vector;

a second signal processor for:

processing a combined signal vector, wherein the combined signal vector is a vector concatenation of the processed first signal vector and the second signal vector, and a decoding circuitry for decoding the processed combined signal vector, and processing an updated combined signal vector, wherein the updated combined signal vector is a vector concatenation of the processed combined signal vector and the third signal vector; and a decoder for decoding the processed updated combined signal vector.

40. The system of claim 39 wherein the first and second signal vectors are received using a retransmission protocol.

41. The system of claim 39 wherein the retransmission protocol is a hybrid automatic repeat request (HARQ) protocol.

42. The system of claim 39 wherein the first and second signal vectors are received using a scheme with a fixed number of transmissions.

43. The system of claim 42 wherein the fixed-number transmission scheme is repetition coding.

44. The system of claim 39 wherein symbols of the received signal vectors correspond to a signal constellation set.

45. The system of claim 44 wherein the signal constellation set is based on quadrature amplitude modulation.

46. The system of claim 39 wherein the received signal vectors are one of coded and uncoded data.

47. The system of claim 39 wherein the combined signal vector, $\tilde{y}'$, is $$\tilde{y}'=[y_1''^T y_2^T]^T,$$

where $y_1''$ is the processed first signal vector, $y_2$ is the second signal vector, and T denotes a transpose operation.

48. The system of claim 39, further comprising a first preprocessor for preprocessing a first channel response matrix associated with the first signal vector, wherein the first signal processor processes the first signal vector using the preprocessed first channel response matrix.

49. The system of claim 48, further comprising a second preprocessor for preprocessing a combined channel response matrix, wherein the combined channel response matrix is a matrix concatenation of the preprocessed first channel response matrix and a second channel response matrix associated with the second signal vector, and wherein the second preprocessor processes the combined channel response matrix using the preprocessed combined channel response matrix.

50. The system of claim 49, wherein the combined channel response matrix, $\tilde{H}'$, is $$\tilde{H}'=[R_1^T H_2^T]^T,$$

where $R_1$ is the preprocessed first channel response matrix, $H_2$ is the second channel response matrix, and T denotes a transpose operation.

51. The system of claim 49 wherein the second preprocessor comprises QR circuitry for decomposing the combined channel response matrix into an upper triangular matrix.

52. The system of claim 51 wherein the QR circuitry comprises circuitry for performing a series of Given's rotations on the combined channel response matrix.

53. The system of claim 49 wherein the second signal processor comprises multiplication circuitry for multiplying the combined signal vector by an orthogonal matrix, $Q'^*$, obtained from the second preprocessor.

54. The system of claim 49 wherein the second signal processor comprises one of zero-forcing and minimum mean squared error equalization circuitry.

55. The system of claim 49 wherein the decoder uses the preprocessed combined channel response matrix to decode the combined signal vector.

56. The system of claim 39, wherein the second preprocessor is configured to preprocess an updated combined channel response matrix, wherein the updated combined channel response matrix is a matrix concatenation of (1) a preprocessed channel response matrix associated with first and second channel response matrices, and (2) a third channel response matrix associated with the third received signal vector.

57. The system of claim 56, wherein the second preprocessor performs substantially identical operations to preprocess the combined channel response and the updated combined channel response matrix.

58. The system of claim 56, wherein the second preprocessor processes the updated signal vector using the preprocessed updated combined channel response matrix.

59. The system of claim 39, further comprising a storage for storing the processed first signal vector and the processed combined signal vector, wherein the processed combined signal vector is stored by overwriting the stored processed first signal vector.

\* \* \* \* \*